United States Patent [19]
Lantz

[11] Patent Number: 5,012,429
[45] Date of Patent: Apr. 30, 1991

[54] METHOD AND APPARATUS FOR OPTIMIZATION OF FEEDWATER HEATER LIQUID LEVEL

[75] Inventor: Joel B. Lantz, Bedford Heights, Ohio

[73] Assignee: Neundorfer, Inc., Willoughby, Ohio

[21] Appl. No.: 298,346

[22] Filed: Jan. 17, 1989

[51] Int. Cl.[5] .................. G01F 23/22; F16K 31/02
[52] U.S. Cl. ............................ 364/509; 364/510; 364/571.01; 340/618; 137/392; 137/395; 73/291; 73/1 H
[58] Field of Search ............. 364/509, 510, 571.01, 364/571.02, 577; 340/612, 618, 622; 137/386, 392, 393, 395; 73/291, 1 H

[56] References Cited

U.S. PATENT DOCUMENTS

| | | | |
|---|---|---|---|
| 4,416,153 | 11/1983 | Williams | 364/509 |
| 4,816,987 | 3/1989 | Brooks et al. | 364/510 |
| 4,819,483 | 4/1989 | Emplit et al. | 364/509 |

OTHER PUBLICATIONS

Standard Operating Procedure Southwestern Engineering Company—Feb. 24, 1977.
Southwestern Engineering Company Letter Jun. 26, 1979.
Utility Products Newsletter, Apr. 1983.
Southeastern Electric Exchange 1983 Annual Conference Apr. 13-15, 1983.
A Review of Salient Conditions Affecting Closed Feedwater Heater Availability and Performance, Jun. 1984.
Feedwater Heater Life Extension Via Programs for Shell Liquid Level, Venting and Allied Systems, Jun. 6-10, 1988.

Primary Examiner—Parshotam S. Lall
Assistant Examiner—Brian M. Mattson
Attorney, Agent, or Firm—Michael Sand Co.

[57] ABSTRACT

A processor controlled supervisory apparatus for a liquid level controller of a feedwater heater obtains DCA characteristics and breakpoints thereof in a programmed manner. A plurality of DCA characteristics are obtained for a plurality of load conditions, and the breakpoints and other operating parameters are stored in a database correlating operation parameters with load conditions. Equations describing the relationship between the parameters and the load conditions are determined by the programmed processor and additional data points determined therefrom to provide load-responsive control for liquid level setpoint. A retrofitting apparatus retrofits the inventive supervisory control apparatus onto existing liquid level controllers.

29 Claims, 12 Drawing Sheets

LA = Level Alarm
LI = Level Indicator
LC = Level Controller

DATA BASE ESTABLISHMENT AND OPERATION ROUTINE (PAGE 3 OF 4)

* WHENEVER NEW ADJUSTMENTS ARE FOUND THEY REPLACE THE OLD, OF COURSE. ALL SUCH VALUES WILL BE STORED IN EEPROM. IF NO "ADJUSTMENTS" HAVE BEEN CALCULATED THE ADJUSTMENT FACTORS ARE OF COURSE ZERO.

DATA BASE ESTABLISHMENT AND OPERATION ROUTINE (PAGE 4 OF 4)

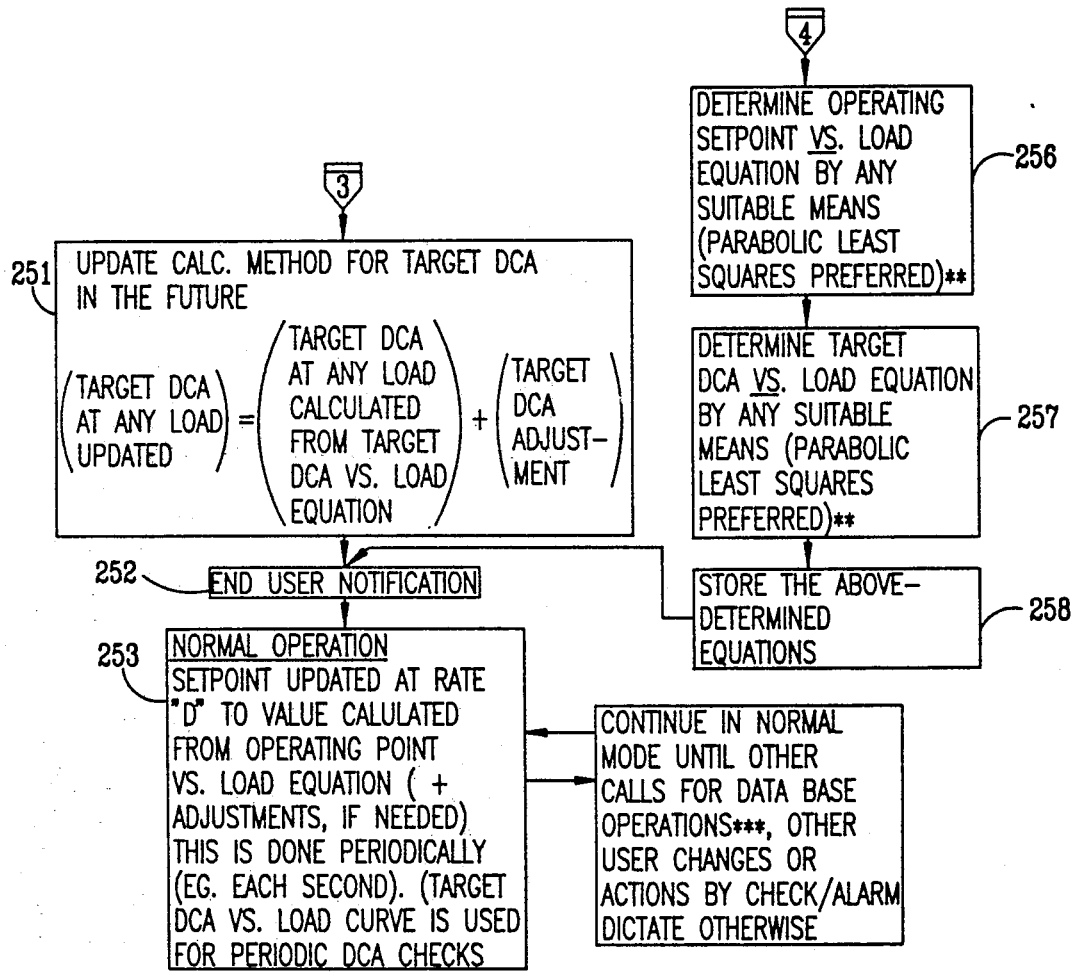

\*\*\* EVEN THOUGH MODE SWITCH MAY NOT BE IN "NORMAL", NORMAL OPERATION IS RESUMED UNTIL USER AGAIN PRESSES "ENTER" BUTTON.

\*\* THESE MAY BE UPDATED EQUATIONS. THIS IS THE ONLY SITUATION IN WHICH EQUATION IS UPDATED. (NOTE THAT UPDATING THE "CALCULATION METHOD", AS INDICATED IN THE LEFT-HAND BLOCKS, DOES NOT UPDATE THE EQUATIONS, BUT ONLY ADDS A FACTOR TO THE CALCULATED RESULT.

FIG. 9D

METHOD AND APPARATUS FOR OPTIMIZATION OF FEEDWATER HEATER LIQUID LEVEL

TECHNICAL FIELD

This invention relates to control of liquid level in feedwater heaters, and more particularly to automatic changing of liquid level setpoints or liquid level controller of a feedwater heater in accordance with an operating equation relating breakpoints of a drains cooler approach curve and boiler load.

BACKGROUND ART

A feedwater heater is a particular type of heat exchanger which utilizes latent heat (as well as sensible heat) of a quantity of steam, used as a heating medium, to raise the temperature of feedwater passing therethrough. Such a heater is typically used in the environments of electric power generators, and more particularly in conjunction with steam boilers used therein. Thus, a train of feedwater heaters may be provided for a plurality of turbine stages with different heaters having different priorities in a hierarchy based on steam pressure and temperature. Of course, similar heaters, as well as the principles of this invention, may be used in other environments.

The structure of a typical closed feedwater heater may be of the type generally designated by reference numeral 10 in FIG. 1. As seen therein, a shell 12 includes an inlet 14 for a passageway for the steam, which may be obtained from various pressure stages of a power turbine. Feedwater enters the heater through an inlet 16. The heated feedwater exits the heater through an outlet 18. The feedwater is recycled back to the power boiler.

Within the typical feedwater heater shown in FIG. 1, there are provided a plurality of heat exchange tubes 20, through which the feedwater flows within shell 12, surrounded by the steam provided through inlet 14. The steam condensate, hereinafter designated as the drains, occurring in the heater is discharged through outlet 22. A detail of the feedwater heater of FIG. 1 is shown in FIG. 2. As illustrated therein, there is provided a subcooler 24 which cools steam condensate 26 to still a lower temperature than attained in the condensing stage, wherein most of the steam's heat is removed as latent heat and wherein gas/liquid equilibrium is essentially obtained. The subcooler 24 thus recovers additional sensible heat from the shell condensate and exchanges the same with the feedwater passing through a path 28 adjacent thereto. The condensate, after further cooling in subcooler 24, exits through drains outlet 22. A valve 30 is provided in the outlet 22, and a level controller 32 is used to control the opening of valve 30 in order to maintain the condensate 26 at a predetermined level within the shell.

In the prior art, the setpoint for level controller 32 is typically set to be at a fixed distance below the bottom dead center of the bottom heat exchange tubes. In one modification provided in the prior art, the liquid level within the shell is determined as follows.

According to this prior art method, the drains subcooler approach, sometimes also referred to as the drains cooler approach and hereinafter identified by the abbreviation DCA, which is the temperature difference between the drains exiting through outlet 22 and the feedwater entering at inlet 16, is measured and plotted as a function of shell liquid level, i.e. the level of steam condensate 26 within shell 12. This data is typically obtained at rated, i.e. maximum, load for the turbine generator operating with steam produced from the heated feedwater provided from the heater 10 (and from other heaters in a typical and known heating train arrangement). A plot of DCA data so obtained is shown at 34 in FIG. 3.

As seen therein, the lower the liquid level the higher the DCA. The relationship between DCA and liquid level, however, exhibits a breakpoint 36. Below the breakpoint the DCA increases significantly. It is known in the art that operation of the feedwater heater at liquid levels below the knee of the curve 34 is inadequate and may result in damage to the heater. Particularly, for liquid levels lower than the level at breakpoint 36, a runaway situation may occur, as follows.

For example, vapor generation may occur at the inlet to subcooler 24. As a result, two phases (liquid and vapor) exist in subcooler 24, resulting in a drop in pressure and in an increase in flow velocity. The increased velocity of the liquid passing through the valves and the cooler creates still a further pressure drop within the cooler, resulting in less efficient heat transfer therein. With less efficient heat transfer, there may occur additional vaporization within the subcooler 24, increasing the flow velocity, further reducing the pressure, etc. Under such conditions, the velocities may increase to destructive levels.

The increased flow velocity, reduced water level and decreased pressure resulting from two-phase conditions within subcooler 24 may erode, knock and vibrate the various heat exchange tubes therein, as well as various end plates, baffles, drains valves and downstream plumbing, resulting in costly (and sometimes irreparable) damage. It is noted that replacement of a large feedwater heater may require expenditures of approximately $500,000.00. Further, since the pressure drop across a valve is related to the square of the fluid velocity therethrough, the above noted increase in velocity may result in conditions where the capacity of the drains valves is exceeded, thus requiring operation of emergency dump valves in order to restore the liquid level within the shell to an acceptable value. It has accordingly been suggested in the prior art to operate with the setpoint adjustment fixed such that the actual liquid level is approximately 1.5 to 2 inches higher than the breakpoint of the DCA characteristic at the boiler load conditions at which the characteristic is obtained, thus providing a margin of safety for varying load conditions.

In the prior art, an extended time period may be required to obtain the curve 34 in FIG. 3, during which an operator manually raises the liquid level to at least 3 inches above the elevation of the bottom most heat exchange tubes. After stabilization of temperatures, performance data is read and the drains approach plotted by dropping the liquid level ½ inch at a time, awaiting stabilization, obtaining the DCA data, and repeating the procedure.

However, such an approach is both highly time consumptive of manual labor and, moreover, is inexact. For example, it may typically require a 10 to 15 minute delay between reading of data points to permit stabilization to occur between successive changes in liquid level. Moreover, upon obtaining the DCA curve of FIG. 3, a sight glass or, untypically, other liquid level indicator is required to be monitored to identify the appropriate liquid level (including the margin above the breakpoint). However, because actual levels typically vary and oscillate due to a multiplicity of error factors, it is difficult to obtain accurate DCA curves by using actual sighted levels. Moreover, it is known that sight glass readings are not sufficiently reliable to obtain precise data.

Still a further disadvantage of the prior art results from the practice of obtaining a DCA curve for a single boiler load, typically the rated load of the boiler. When load requirements vary, the DCA characteristics vary as well. Most heaters can be safely operated at decreased liquid level setpoints at lower loads where operation is more efficient. However, because of the prior art difficulty in obtaining the DCA characteristics, only a single such characteristic is obtained and a liquid level control setpoint is typically established such that the liquid level is at a fixed value, typically 1.5 to 2 inches above the breakpoint for maximum rated load, as previously described. Thus, when lower load requirements are imposed on the boiler, operational efficiency is poorer than necessary because the liquid level setpoint is fixed at its predetermined value and is higher than is necessary, providing an excessive margin of safety and resulting in less efficient operation.

By providing an excessive safety factor, i.e. a higher liquid level than necessary, the terminal temperature difference (the difference between saturation temperature corresponding to the entering extraction stream and the outlet feedwater temperature) may experience variations equivalent to loss in heated feedwater temperatures on the order of tenths of a degree. Thus, at low loads, where such an excessive safety factor is likely to occur, the temperature loss resulting from the combined effects of an entire train of feedwater heaters may be as much as a few degrees. Although the temperature differences may appear small, the same may be reflected in losses of more than a billion BTU of energy per year, in waste of a million pounds of coal per year or more, in discharge of thousands of pounds of sulfur oxides into the environment each year, and in added operating expenses of many thousands of dollars per year for a single large power generating boiler (e.g. 500 MW).

There is accordingly a need in the prior art to minimize excesses in safety margin of liquid levels in feedwater heaters.

It is particularly necessary to simplify the manner in which DCA characteristics are obtained in order to permit more load-responsive adjustment of liquid level for shell condensate in feedwater heaters.

Still more particularly, there is a need to reduce the amount of manual intervention required to obtain such DCA characteristics.

There is, in other words, a significant need in the prior art to provide more efficient operation of feedwater heaters by setting the liquid level to the lowest permissible nondestructive levels.

Still a further deficiency in the prior art is the inability appropriately to moderate the liquid level in accordance with variations in load in order to enhance operation of feedwater heaters.

Because of the above described unmet needs, the prior art generally fails to optimize operation of feedwater heaters.

DISCLOSURE OF THE INVENTION

It is accordingly an object of the present invention to overcome the deficiencies of the prior art.

It is a more specific object of the invention to optimize operation of a feedwater heater.

It is another object of the invention to simplify the manner in which DCA characteristic data is obtained for a feedwater heater, thus to reduce the amount of manual intervention required to obtain DCA characteristics.

It is a more specific object of the invention to provide more efficient operation of feedwater heaters by setting the liquid levels therein to the lowest nondestructive levels permissible for a particular load.

A more particular object of the invention is to provide supervisory control of an existing liquid level controller of a feedwater heater in order to vary the setpoints of the controller in accordance with load variations, thus to increase efficiency of operation and to extend the lifetime of the various component thereof.

Still a more particular object of the invention is the provision of an automated system for obtaining a DCA characteristic for a feedwater heater.

Yet another object of the invention is to provide an automated method and apparatus for obtaining a plurality of DCA characteristics in order to supervise control of liquid levels in a feedwater heater in accordance with boiler load.

It is an additional object of the invention to provide a supervisory control apparatus for a feedwater heater in which an operating equation, or characteristic, is obtained from a plurality of DCA characteristics, the operating equation providing a functional relationship between the breakpoints of the DCA characteristics and the load requirements of the boiler.

Still another and detailed object of the invention is to provide method and apparatus for controlling a setpoint for liquid level in a feedwater heater in accordance with the load on the boiler utilizing the feedwater by generating a plurality of DCA characteristics for differing loads on the boiler, obtaining a functional relationship between the breakpoints of the DCA characteristics and the different load conditions, interpolating between the breakpoints of the DCA characteristics to establish load level setpoints of load conditions other than those used to obtain the DCA characteristics, at any time identifying the load on the boiler and, in accordance with the operating characteristic, establishing the setpoint for the liquid level corresponding to the identified boiler load.

In accordance with the foregoing and other objects, there is accordingly provided a liquid level control apparatus for a feedwater heater including a shell and a tubing structure. The apparatus includes a storage for storing liquid level setpoint data as a function of load on the feedwater heater, a level sensor for providing level data, a controller responsive to the setpoint data from the storage and to the level data from the level sensor for controlling a discharge valve to discharge condensate from the shell of the feedwater heater thus to control the liquid level in the shell of the feedwater heater, and a load identifying device for identifying a load on the feedwater heater and for providing load data to the storage. The storage is operable for establishing liquid level setpoints for the controller as a function of the load data, thus providing load-responsive level control for the feedwater heater and optimizing operation thereof.

The storage may include an electronic processor, which may be a microprocessor, and respective temperature sensors for the drains and the entering feedwater, hereinafter referred to collectively as a drains cooler approach temperature sensor, for providing DCA temperature data to the processor. The processor is operable for establishing a first database correlating measured DCA data with liquid level setpoints for predetermined load conditions of the feedwater heater, where the setpoints are established from breakpoint data of different DCA characteristics for the predetermined load conditions.

The processor is additionally operable for converting the first database to a second database, correlating the liquid level setpoints with feedwater heater load, and for providing a particular liquid level setpoint datum to the controller in response to a particular load datum provided by the load identifying device.

Preferably, the processor is programmed to determine a functional relationship between the liquid level setpoints and feedwater heater load for those data points and to provide additional data points, correlating liquid level setpoints with loads other than those converted from the first database.

The controller may include a motor responsive to the liquid level setpoint data for driving a mechanical liquid level controller, the latter in turn being operable for activating the discharge valve. One such motor may be a stepper motor.

The controller may further include a retrofitting structure, including a mechanical interface device, for interfacing an output shaft of the motor to an adjusting device for adjusting a setpoint of the mechanical liquid level controller.

One form of the retrofitting structure may be a geared drive for interfacing the output shaft of the motor to a shaft of a manually controlled setpoint adjuster of the mechanical liquid level controller.

Alternatively, the controller might include a pressure adjusted mechanical liquid level controller, operable for activating the discharge valve, and a transducer responsive to a signal from the processor. The signal represents the liquid level setpoint data for generating a pressure for controlling the pressure adjusted liquid level controller to activate the discharge valve.

Thus, the storage and processor form part of a supervisory controller for a mechanical or pressure adjusted liquid level controller.

The discharge valve may include an electrically controlled valve and the controller may include an electrical proportional controller, responsive to a signal from the processor representing the liquid level setpoint data. Such an arrangement is operable for generating a electrical signal for controlling the electrically controlled valve.

Alternatively, the discharge valve may include a pneumatically controlled valve and the controller may include an electrical proportional controller, responsive to a signal from the processor representing the liquid level setpoint data and operable for generating an electrical signal. Moreover, such an apparatus includes a transducer for converting the electrical signal generated by the electrical proportional controller to a pneumatic pressure for controlling the pneumatically controlled valve.

In an alternative approach, the invention is an improved liquid level control apparatus for a feedwater heater including a shell and a tubing structure, a controller responsive to liquid level setpoints provided thereto for controlling a discharge valve to discharge condensate from the shell of the feedwater heater to control the liquid level therein and a drains cooler approach temperature sensor for providing DCA temperature data. The improvement includes a closed loop database generator for generating a database correlating the DCA temperature data with the liquid level setpoints for predetermined load conditions of the feedwater heater. The closed loop database generator includes a storage, receiving the DCA temperature data and storing the data as a function of a current liquid level setpoint data. Additionally, there is provided an incrementing means for providing an incremental adjustment to the current liquid level setpoint data. The incrementing means is operable for providing a plurality of substantially periodic incremental adjustments of the liquid level setpoint data, the adjustments being spaced from one another by substantially constant, small, time intervals. The incremental setpoint adjustments are of magnitudes chosen to provide reduced perturbations in control stability of the feedwater heater and the substantially constant time intervals are chosen to provide a condition of substantial equilibrium in response to the incremental adjustments. The increments and intervals thus provide a substantially continuous change in setpoint and liquid level at a low perturbation level approximating equilibrium and eliminate the prior art requirement for extensive delays between large changes in liquid level when obtaining a DCA characteristic.

In this arrangement, the adjusting device includes a processor responsive to storage of the DCA temperature data for determining passage of the substantially constant time interval, as well as for providing a signal to the controller commanding modification of the liquid level setpoint data by the incremental adjustment.

The arrangement further includes a load identifying device for identifying a load on the feedwater heater and for providing load data to the storage. In such a configuration, the processor is operable for converting the database to a second database, wherein the liquid level setpoint data is stored in the storage as a function of the load data.

Moreover, the processor may further be operable for generating for the second database additional liquid level setpoint data, between data points obtained from the first mentioned database, thereby providing a setpoint characteristic for controlling the liquid level of the feedwater heater as a function of load thereon.

Additionally, the processor may be operable for controlling operation of a liquid level controller for the feedwater heater by providing signals representing liquid level setpoints for the feedwater heater, where the setpoints are obtained from the second database as a function of load data provided by the load identifying device.

In accordance with another aspect of the invention, there is provided a method for optimizing liquid level in a feedwater heater, in which, for a predetermined load condition of the feedwater heater, a setpoint for the controller is periodically incremented or decremented by magnitudes chosen to provide reduced perturbations in control stability of the feedwater heater. A database is generated, correlating the drains subcooler approach temperature data as a function of the liquid level setpoints for the predetermined load condition of the feedwater heater, thereby providing a curve of drains subcooler approach temperature data against liquid level setpoints or each group thereof. Finally, for each of the periodic increments or decrements of the setpoints, or each group thereof, a function of a slope of the curve is compared with a predetermined threshold therefor to determine a breakpoint of the curve, thereby to identify a liquid level setpoint corresponding to the load condition.

The method further may include the step of establishing a stable one of a plurality of load conditions of the feedwater heater and, for each of the load conditions, generating a curve correlating drains subcooler approach temperature as a function of liquid level setpoints. The method may further include the step of converting the database, including a plurality of curves, to a second database wherein the liquid level setpoint data is stored as a function of the load condition of the feedwater heater. The method may include the further step of determining a load condition of the feedwater heater and, responsively thereto, accessing the second database for identifying a liquid level setpoint suitable for the feedwater heater operating under the determined load condition.

Alternatively, the inventive method includes the steps of receiving a load data signal and, responsively to the received load data signal, accessing a database storing liquid level setpoint data as a function of the load condition o the feedwater heater. From the database, a liquid level setpoint is retrieved, corresponding to the load condition identified by the load data signal. A liquid level setpoint signal is provided to the controller for establishing a liquid level corresponding to the load condition.

The method may further include the steps of determining a breakpoint for each of a plurality of DCA curves, and for each of the breakpoints thus determined, correlating a liquid level setpoint with the predetermined load condition represented by the curve having that breakpoint. A characteristic operating equation is then established, representing a relationship between the liquid level setpoints and the load conditions for the breakpoints.

Alternatively, the method may include the step of obtaining a liquid level setpoint corresponding to the received load data signal by interpolating between two datapoints of the database represented by breakpoints of two curves obtained for different load conditions of the feedwater heater.

These and other objects, features and advantages of the present invention will become apparent to those skilled in the art from the following description and drawings, wherein there is shown and described a preferred embodiment of the invention, simply by way of illustration and not of limitation of one of the best modes (and alternative embodiments) suited to carry out the invention. The present invention is capable of still other, different, embodiments and its several details are capable of modifications in various obvious aspects, all without departing from the invention. Accordingly, the drawings and the descriptions provided herein are to be regarded as illustrative in nature and not as restrictive of the invention.

BRIEF DESCRIPTION OF THE DRAWING

In accordance with the above described objects and features of the invention, a preferred embodiment thereof is shown in the accompanying drawings, wherein.

BEST MODE FOR CARRYING OUT THE INVENTION

Figure 1:
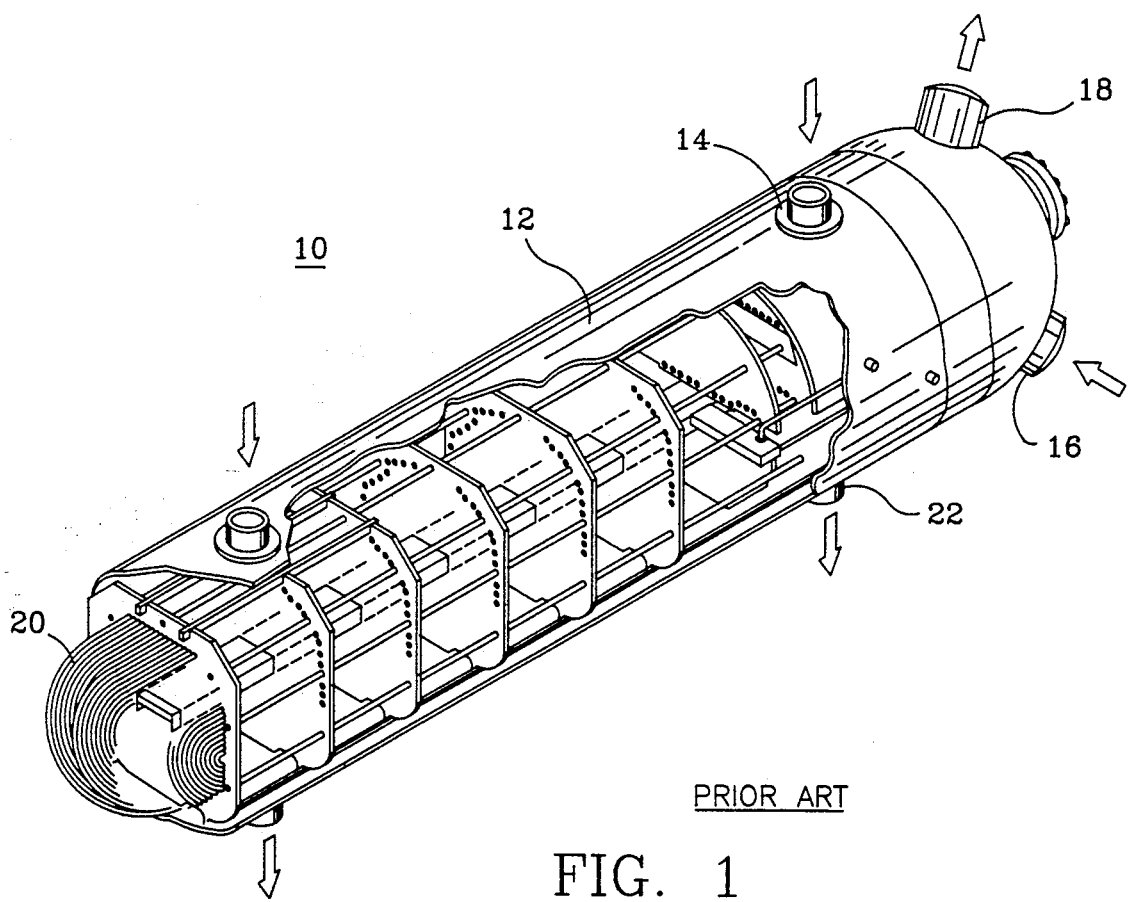
FIG. 1 shows a prior art feedwater heater to which the invention is applied.
Figure 2:
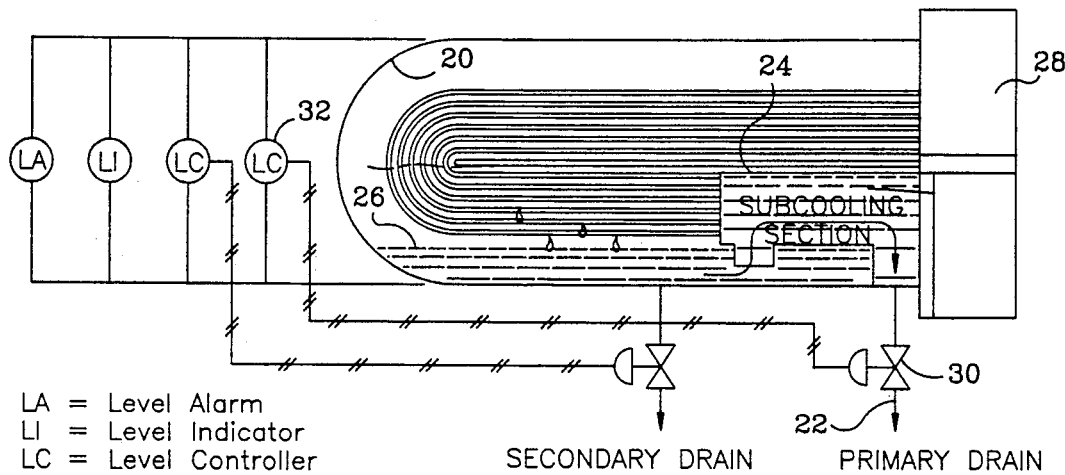
FIG. 2 shows a detail of the heater of FIG. 1.
Figure 3:
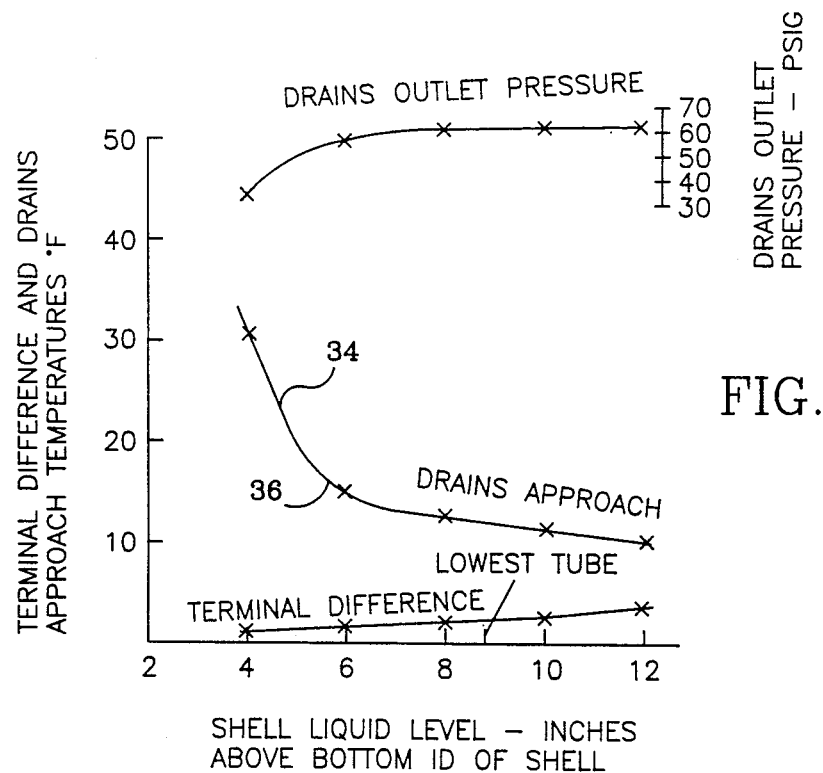
FIG. 3 is a plot of DCA data for a feedwater heater.

In accordance with the above described features and advantages, the apparatus shown in the drawings includes a processor programmed to perform various steps illustrated in the flowcharts. Although the following description identifies the processor as a microprocessor, it should be understood that any form of electrically programmable apparatus may be used, which may include a mainframe, a minicomputer or a one-chip microprocessor based computing system.

In accordance with the invention, there is provided a microprocessor controlled supervisory apparatus for a liquid level controller. The supervisory apparatus permits DCA characteristics to be obtained in an automated manner, and by providing statistical averaging of data points over segments of the curve, increases the accuracy of the locations of the breakpoints of the DCA characteristics thus obtained. The microprocessor used in the inventive arrangement is programmed to locate a breakpoint from the data obtained therefor for each DCA characteristic for a plurality of load conditions. The breakpoint of each such characteristic is stored, together with data identifying the load condition under which the characteristic was obtained, to provide a correlation between load and breakpoint and hence between load and operating setpoint.

As will be understood from the following description, the microprocessor is programmed to determine a functional relationship between the load condition and the breakpoint and, from the functional relationship, to interpolate additional data points used to establish breakpoints for any load condition encountered during operation. Thus, in response to any load condition encountered during operation, the breakpoint in the DCA characteristic is accessed from the stored data and is used to provide a control signal for establishing or modifying the setpoint for the liquid level controller.

Figure 4:
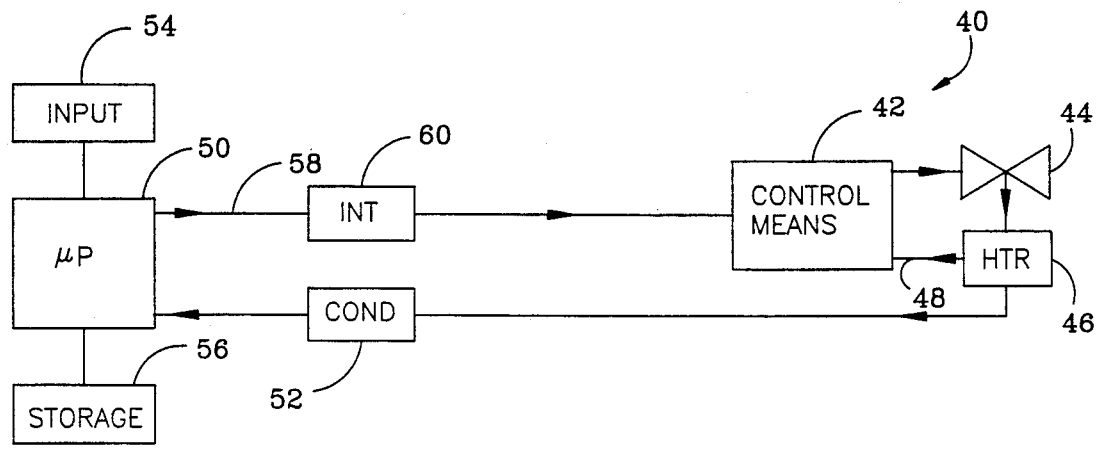
FIG. 4 is a symbolic representation of the apparatus of the invention.

A symbolic representation of the inventive system is illustrated in FIG. 4 and is generally identified by reference numeral 40. As shown therein, the invention provides a control means 42 for operating a discharge valve 44 of feedwater heater 46. Control means 42 receives some information from heater 46 on a data line 48. Information identifying the status and various operating conditions of heater 46 is further conveyed to a microprocessor 50. The signals provided from heater 46 to microprocessor 50 may first be processed by a conditioning circuit 52. An input device 54 is shown as a source of control signals for microprocessor 50. Input device 54 may be a keyboard or individual switches on circuit boards or on a control panel for the inventive apparatus, or may be a host computer connected through a suitable interface, and permits user control of the system.

It should be recognized that microprocessor 50 in fact represents a central processing unit of a computational system, including a storage 56. As known in the art, storage for a computational system includes random access memory (RAM) for storage of programs and data and a read only memory (ROM) for storage of fixed programs and control sequences. In accordance with the invention, various portions of the storage 56 provided in the computational system supervising the level control system is in fact an electrically programmable read only memory (EPROM), usable in a manner which will be well known to those of ordinary skill in the art.

In response to input signals provided via input device 54, microprocessor 50 accesses data from storage 56 and executes programs stored therein, particularly responding to various conditions of feedwater heater 46, provided from conditioning circuit 52. The microprocessor generates a number of output signals, provided on an output line 58 to an interface circuit 60. Interface circuit 60 provides appropriate level and timing changes for the output signals of microprocessor 50 and generally converts the output signals to appropriate commands for the control means 42. As will be further appreciated from the subsequent description of the programs executed by microprocessor 50, the structure illustrated in FIG. 4 operates to obtain a DCA characteristic without manual intervention. During this operation, microprocessor 50 identifies and locates a breakpoint of the DCA characteristic, storing the same in storage 56. In one form, the invention may thus be used to provide a simplified and automated procedure for obtaining a DCA characteristic for a feedwater heater. In view of the automated nature of the procedure, the invention may also be viewed as a method and apparatus for obtaining a plurality of DCA characteristics for different load conditions on a feedwater heater, and for identifying the breakpoint of each characteristic to establish a database providing a correlation between load condition and breakpoint for that heater. In a separate operational capability, the apparatus of FIG. 4 utilizes data from a database in storage 56, as well as operating information describing the status of heater 46, to provide ongoing operational control of discharge valve 44 via control means 42, thus varying the liquid level setpoint for the steam condensate within the shell of heater 46 in accordance with changing load conditions on the heater.

Figure 5:
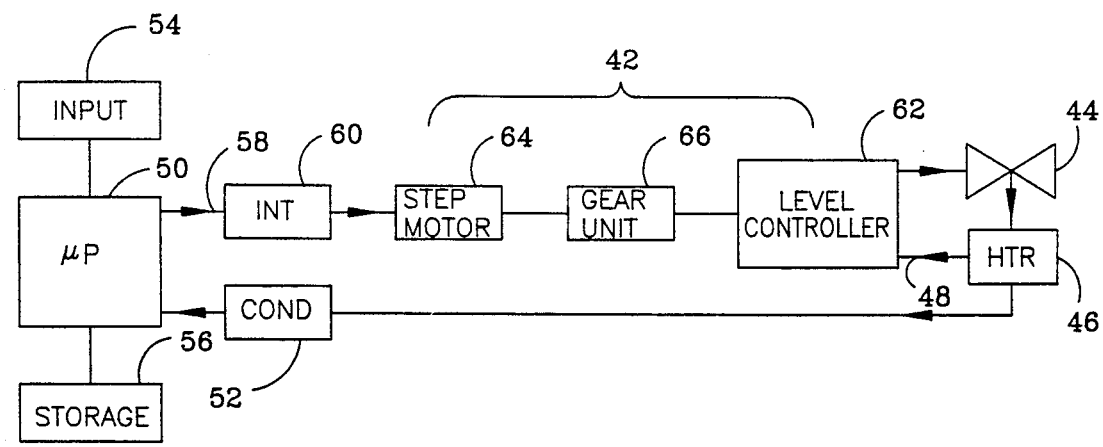
FIG. 5 shows one illustrative embodiment of the apparatus of FIG. 4.

Referring now to FIG. 5, there is shown an illustrative embodiment of the invention symbolically illustrated in FIG. 4 as retrofitted on to an existing level control system. More particularly, the specific embodiment of control means 42 is shown as including a known level controller 62 for providing setpoint control of discharge valve 44. Such level controllers are well known and are available, for example, from the Fisher Controls Company of Marshalltown, Iowa, under the designation "2500 Series". One particular type of controller includes a manually adjustable mechanical setpoint adjusting portion (not shown). Upon adjusting the setpoint adjusting device to a particular setpoint level, signals from a level sensor of the feedwater heater 46 are provided to the controller 62 to provide a feedback control system for maintaining the level at the established setpoint.

The present invention, however, provides supervisory control of level controller 62 by automatically operating the adjusting means thereof in response to boiler load conditions. Thus, in the embodiment of FIG. 5, the output signals of microprocessor 50, after conditioning by interface circuit 60, are used to control a step motor 64. In accordance with the invention, one manner of providing supervisory control for the level controller 62 is to provide mechanical adjustment of the adjusting means thereof.

Thus, step motor 64 is used to provide rotation, or other mechanical displacement, of the adjusting means for the setpoint of level controller 62. An interface gearing unit 66 is used to convert rotation of the output shaft of step motor 64 to appropriate rotation of a control shaft for the setpoint adjuster of level controller 62.

It should be appreciated that, although the foregoing description refers to a step motor 64, any type of motor may be utilized in the invention. In that regard, the description of interface gearing unit 66, found hereinbelow, facilitates the utilization of step motor 64 for providing the actual adjustment for the setpoint adjusting means of level controller 62. However, other devices may be used for controlling the setpoint adjuster of level controller 62, such as linear motors, relays and other mechanical displacing means. Indeed, for level controllers including built in processing units, stepper motor 64 may be omitted and microprocessor 50 may provide control signals directly to the built in processing unit of the level controller.

The illustrative embodiment of FIG. 5 includes a level controller 62 for maintaining the liquid level within heater 46 at a setpoint established therefor by setting of the setpoint adjuster of the controller. The setpoint of level controller 62 is varied by step motor 64 in accordance with signals provided thereto by microprocessor 50 through the interface circuit 60. The signals generated by microprocessor 50 are varied in accordance with the load condition of heater 46 and in accordance with breakpoint versus load data established and stored in the storage device 56.

It should be noted that adjustment of the liquid level in heater 46 may be varied by microprocessor 50 either under a fixed load condition, for the purposes of establishing a DCA characteristic for the heater, or in accordance with the inventive load-responsive operation. A user selects the particular mode of operation as being the curve establishing (data gathering) mode or the operational mode. It will thus be appreciated that the operation and control of the valve 44 does not differ in the two modes hereinabove described. However, in the data gathering mode of operation the setpoint of level controller 62 is variably adjusted, notwithstanding a constant load on heater 46. Thus, during this mode of operation heater 46 is not operating in an efficient or load responsive manner.

Accordingly, prior to undertaking a data gathering mode of operation for a specific heater, the inventive arrangement advantageously ascertains whether another feedwater heater in the train of heaters is undergoing a DCA characteristic establishment procedure at the same time. If another heater is, indeed, being operated for the purpose of establishing the DCA characteristic thereof, microprocessor 50 is programmed to avoid simultaneously establishing the DCA characteristic of heater 46.

Preferably, a DCA curve for one heater will not be determined until passage of a time period, e.g. ten minutes, subsequent to conclusion of a DCA curve procedure for another heater, to allow stabilization of the other heater. Further, a sequence of priorities is hierarchically established for the various heaters in a train of feedwater heaters, to assure that DCA characteristics will be appropriately established, on a priority basis, if various feedwater heaters in a train of heaters simultaneously attempt to access the DCA curve routine of their respective controllers. Since a DCA curve done for a lower pressure heater affects the fewest other heaters, lower pressure heaters will have higher priorities. Thus, when two (or more) heaters simultaneously call to DCA curves, only the request of the higher priority heater will be honored. Alternatively, in response to simultaneous requests, all requesting heaters may be ordered to wait and request again upon expiration of the wait period. Higher priority heaters will be assigned shorter wait periods than lower priority heaters. The priorities may be assigned by rotary hex switches associated with each heater.

Figure 6:
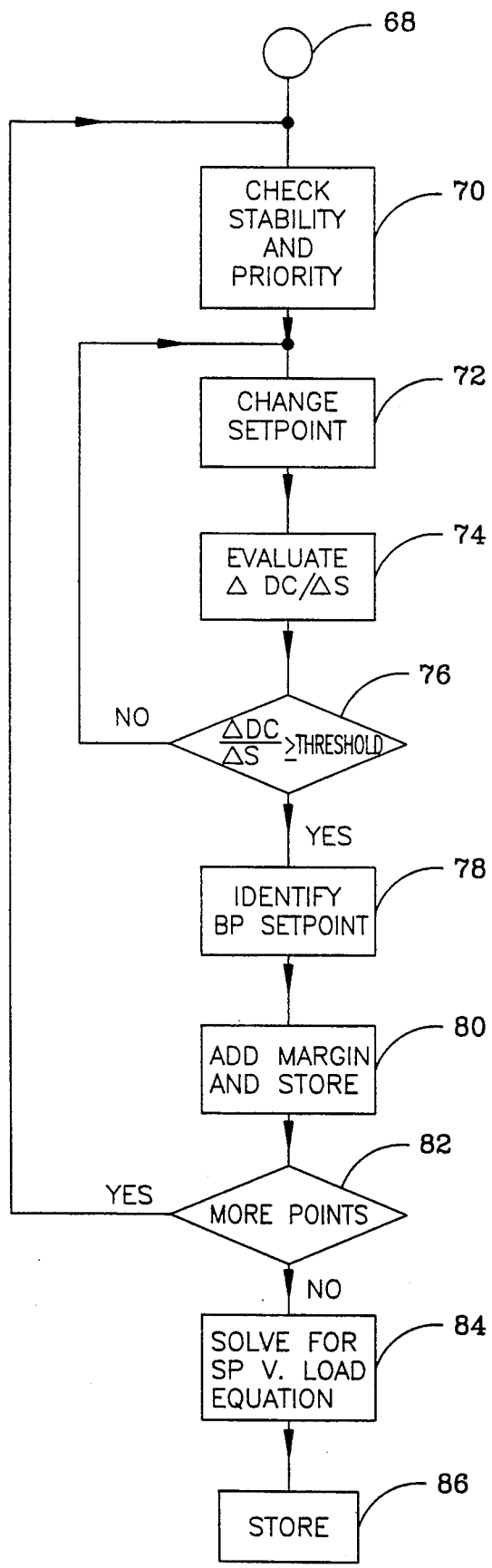
FIG. 6 is a flowchart broadly illustrating operation of the microprocessor controlling the inventive apparatus.

Referring now to FIG. 6, there is broadly illustrated therein a program controlling microprocessor 50 to establish the database used for generating control signals for varying the setpoint of level controller 62. The control program is initiated by a request at step 68, and at step 70 the load stability, as well as the priority of the particular feedwater heater, are checked.

Load stability is checked to ascertain whether the load on heater 46 is varying, in which event a constant-load DCA characteristic can not be obtained and the request is dishonored, or whether the load level has stabilized to within predetermined limits, in which event the DCA characteristic may be obtained and the request is honored. Similarly, if a DCA characteristic is being obtained for another heater, or if other heaters of higher priority are awaiting the determination of a DCA characteristic therefor, the request for execution of the DCA curve routine is dishonored and the control sequence returns without executing the routine.

Once stability and priority are established, the control sequence of the routine illustrated by the flowchart of FIG. 6 continues to step 72. Therein, microprocessor 50 outputs signals to change the setpoint adjustment of level controller 62 by a predetermined amount, $\Delta S$. As has been described hereinabove, the change in setpoint implemented by step 72 is performed sufficiently slowly and substantially uniformly to avoid significant deviation of the liquid level from equilibrium values. During the course of the change $\Delta S$ or within a fairly short period of time thereafter, drains cooler approach temperature ($\Delta DCA$) data is evaluated and the change of DCA with setpoint change is computed at step 74. The change may be composed of a single increment or a multiplicity thereof, and the change in DCA ($\Delta DCA$) with setpoint change may be determined from data collected before and after the setpoint change and/or from data collected during the change (e.g. as a multiplicity of data points). The resultant data, identifying change in DCA as a function of change in setpoint, is stored at least temporarily, forming a first database identifying the DCA characteristic.

At step 76, it is determined whether the change in approach as a response to the change in setpoint exceeds a predetermined threshold. If the change in DCA remains below the predetermined threshold, operation returns to step 72 and the cycle repeats for additional data points, so that the pre-breakpoint portion of the DCA characteristic is obtained for the feedwater heater operating at the particular, stable, load.

It should be appreciated that steps 74 and 76 which make reference to evaluation of the slope of the DCA characteristic and to a threshold determination for that slope, may, in fact, also include determinations of the change in slope (i.e. the second derivative) of the DCA characteristic. Thus, it may be a combination of the slope and its derivative, or the slope derivative alone, which may be used to establish the breakpoint 36 of the DCA characteristic. Additionally, it will be appreciated from the flowchart that the present invention provides a slope evaluation (or a slope derivative evaluation) for each change in setpoint $\Delta S$.

If the test of step 76 results in an affirmative determination, control proceeds to step 78 wherein the breakpoint of the DCA characteristic is obtained. The specific details by which the breakpoint setpoint is identified are subsequently described. However, for purposes of understanding the broad description of the flowchart of FIG. 6, it is simply noted herein that the present invention provides two approaches for identification of the breakpoint setpoint.

In accordance with a first approach, the breakpoint setpoint may simply be identified as occurring at that setpoint changed in step 72 which results in a slope of the DCA characteristic exceeding the predetermined threshold, as determined at step 76. In an alternative approach, the breakpoint setpoint may be determined by continuing to change the setpoint to obtain the post-breakpoint portion of the DCA characteristic. The equations of the two nominally linear segments forming the pre- and post-breakpoint portions of the DCA characteristics are obtained and the intersection of the linear characteristics is computed. The computed intersection is then identified as the breakpoint setpoint.

In either approach, having identified the breakpoint setpoint for the particular DCA characteristic, an appropriate safety margin is added thereto and the resultant liquid level setpoint is stored at step 80. The data stored at step 80 thus generates a second database, correlating operational setpoints with particular loads and storing the same in storage 56.

At step 82, it is determined whether additional data points are to be determined for the second database.

In the preferred embodiment of the invention, since the operating characteristic correlating load and operational setpoint to be established is to be identified by use of at least a second order polynomial, the present invention provides at least three data points. That is, at least three DCA characteristics are obtained, and the breakpoint from each of the three characteristics is stored in the second database. If additional data points are to be taken, an affirmative result of step 82 results in reexecution of steps 70 through 80 following stabilization of the boiler at other appropriate loads.

Once it is determined that sufficient data has been stored in the second database, the operational control proceeds with step 84, wherein a second order polynomial is established for the data points in the second database. As hereinbelow described, the equation obtained at step 84 utilizes the well-known least-squares approach. However, quite clearly, any mathematical approach may be utilized to obtain a mathematical description of the relationship between the load and the setpoint. Moreover, for greater accuracy, more than three points may be obtained to provide a statistically larger database and/or to permit a higher order polynomial to be used for approximating the operating equation relating setpoint to load on the feedwater heater. The resultant equation, and/or other data points generated in accordance therewith, are then stored at step 86.

Thus, the flowchart of FIG. 6 broadly illustrates the manner in which DCA characteristics are established utilizing the inventive arrangement and, moreover, the manner in which the significant breakpoint data therefrom is stored to provide the operational database to be used for operational control of valve 44.

During operation of the feedwater heater, the database stored in step 86 is thus accessed and referenced to provide ongoing and continuing control of liquid level by responding to signals identifying the load condition on heater 46, accessing the appropriate setpoint for the actual operating load on the heater, and generating the specific control signals to operate step motor 64, for example.

With reference to the steps of FIG. 6, it should be understood that the load on a particular feedwater heater is determined by the load requirement placed on the turbine utilizing the water heated thereby. Accordingly, an external load signal used to control the turbine generator may be provided to microprocessor 50 to identify the particular load level of operation of the heater and to determine the stability thereof.

Alternatively, the load data incoming to microprocessor 50 may be a shell pressure signal or a shell temperature signal, generated by a shell pressure sensor or a shell temperature sensor, respectively. From knowledge of the full load shell pressure, operation at any specified load may be identified by obtaining a percentage ratio of the detected shell pressure to the full load shell pressure.

In another alternative approach, where only temperature data is available, a steam table may be used to convert the shell temperature data to shell pressure data. The percentage level of load for which the DCA characteristic is being established, as well as the instantaneous operating load for which a setpoint is to be established, is then determined in the above manner, as a percentage ratio of the shell pressure obtained from the steam table to the full load shell pressure. Of course, it will be appreciated by those of ordinary skill that steam tables may be stored in a ROM section of storage 56.

A selector switch (not shown) is thus provided as one of the inputs of the input device 54. The user sets the selector switch to identify which of the three load determining signals (external boiler load signal from boiler control room, pressure signal or temperature signal) is to be used to identify the load level for the DCA characteristic.

Additional temperature data is provided from a feedwater temperature sensor and a drains temperature sensor. The outputs of these two sensors are provided to microprocessor 50 in order to compute therefrom the DCA. Thus, the signals provided from heater 46 via conditioning circuits 52 include boiler load, shell pressure or temperature, feedwater temperature and drains temperature. Conditioning circuit 52 performs well known signal conditioning operations on the analog data and then provides analog to digital conversion thereof, in order to produce output digital data usable by microprocessor 50. Once the appropriate computations have been performed by microprocessor 50, the control signals for establishing the operating setpoint are output thereby as digital signals on output line 58. Interface circuit 60 represents digital to analog conversion, if necessary, and any signal conditioning required to make the output signals compatible with the signal requirements of control means 42. Digital to analog conversion may or may not be necessary depending on the nature of the control means.

Moreover, although FIG. 5 shows one embodiment of the control means 42, other level controllers may be used so that, rather than utilizing a step motor, different devices may be used to carry out adjustment of setpoint in response to microprocessor 50. In one example, discharge valve 44 may be an electrically controlled, motorized valve. An electrical proportional controller, such as model UT30-131*B from Yokogawa Corporation of America in Newnan, Georgia, may be provided to control the valve 44. For such an arrangement, interface circuit 60 converts the command output signals from microprocessor 50 to analog signals, having the range of 4 to 20 mA. Other such controllers utilize different voltage levels, such as voltages in the range of 0 to 5 volts or 1 to 5 volts, for example, or current in the range of 0 to 20 mA.

Yet another embodiment of the invention may utilize the above noted proportional controller. However, a pneumatic interface may be used, such as a VDO type 22/06-15 current-to-pressure converter, available from VDO Mess-Und Regaltechnik GMBH, to convert the output of the controller to a pressure, as used to control any of a number of suitable types of pneumatic valves. In an environment where a pneumatic control valve is used, the control means 42 may include a voltage-or-current-to-pressure transducer responding to the conditioned signals output by interface circuit 60 instead of the electrical proportional controller hereinabove described. The transducer may then provide a pressure output to a mechanical liquid level controller having a pneumatic level sensor input and a remote pneumatic setpoint, such as available under the designation 2516 from the Fisher Controls Company of Marshalltown, Iowa. In another variation, a pneumatic liquid level controller such as a type 2502 from Fisher Controls Company may be used together with a drive motor for establishing the setpoint thereof. One such motor is available from Oriental Motor USA, of Torrance, California, under the designation Oriental PXB44H-03BA.

In each of the above described examples, a liquid level sensor (which may be electrical, pneumatic or direct mechanical measuring type) provides a liquid level signal to the controller, as indicated on data line 48. Depending on the specific one of the above described level controllers, the signal on data line 48 may be converted to a pneumatic sensor signal, to an electrical sensor signal or to a mechanical sensor by direct linkage.

Thus, two control paths are illustrated in FIGS. 4 and 5. In a first path, a feedback loop of level controller 62 controls the liquid level of heater 46 by operation of discharge valve 44. A signal representing the liquid level within heater 46 is fed back to controller 62, thus closing the feedback loop forming the first control path.

The second control path of the present invention provides a load signal to microprocessor 50 from the heater 46 and, in response thereto, provides a control signal for adjusting the setpoint of level controller 62.

From the previous description of FIG. 5, it will be appreciated that the present invention provides both a supervisory control system for an existing level controller 62 and a retrofitting arrangement, whereby the improvement may be applied to an existing level control system. In FIG. 5 the element 64, representing a step motor responsive to signals generated by microprocessor 50, and an interface gearing unit 66, providing the appropriate mechanical interface between step motor 64 and level controller 62, provide the retrofitting arrangement by which the remaining elements may be incorporated in the existing level control system.

Figure 7:
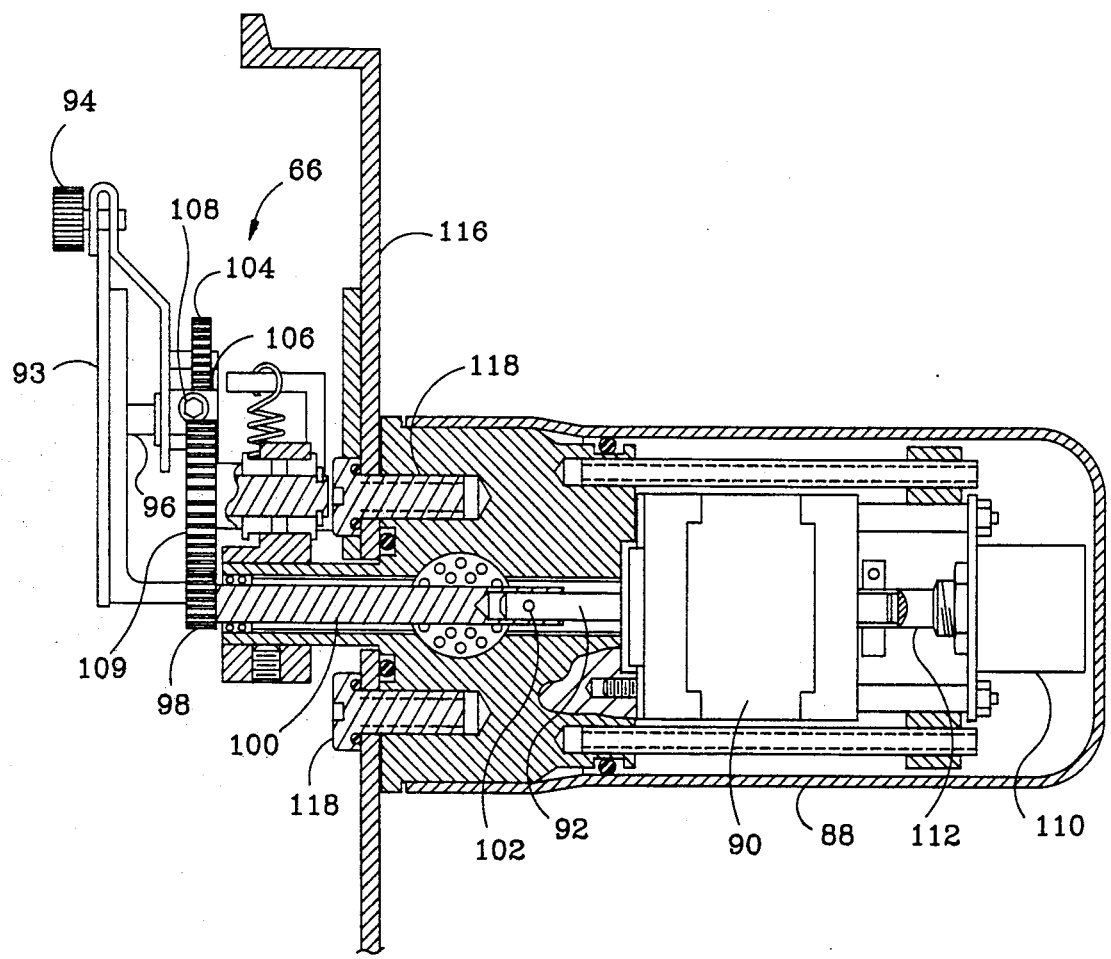
FIGS. 7 and 8 show details and perspective views, respectively, of a retrofitting arrangement for the invention.
Figure 8:
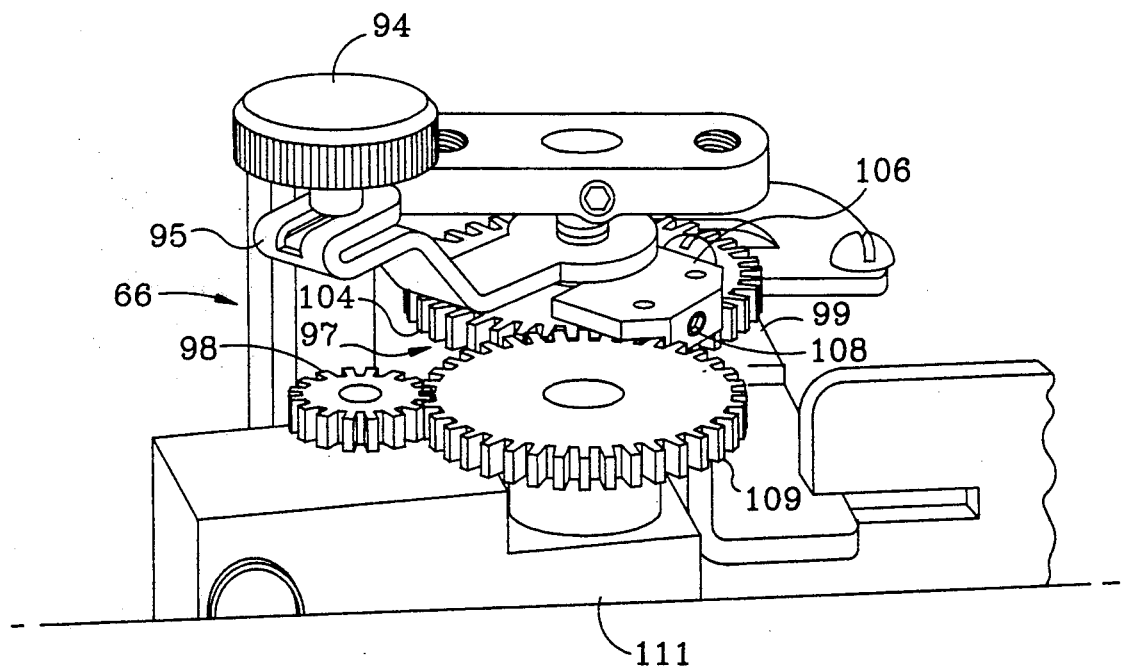

The interface gearing unit is illustrated in greater detail in FIG. 7. A perspective view of the engagement of unit 66 with the level controller 62 is shown in FIG. 8. As shown in FIG. 7, there is provided a housing 88 for a step motor 90. The motor responds to output signals from microprocessor 50, provided on output line 58 and conditioned by interface circuit 60. In response to the control signals provided by the microprocessor, step motor 90 rotates an output shaft 92 in a step wise manner.

A portion of the existing level controller is also illustrated in FIG. 7. As seen in FIGS. 7-8, a setpoint adjusting knob 94 is manually operated to increase or decrease the liquid level setpoint. Adjustment of knob 94 causes rotation of a shaft 96 to provide the desired adjustment.

In a known liquid level controller, the Fisher type 2502, rotation of knob 94 causes movement of the knob around the periphery of a dial 93 seen in FIG. 7. Knob 94 is pivoted about shaft 96 by a coupling lever 95. Rotation of shaft 96 rotates a cam 97 and displaces a cam follower 99, which provides appropriate adjustment of the setpoint.

Interface gearing unit 66 is connected to output shaft 92 to cause rotation of shaft 96 in response to output signals provided by microprocessor 50, thus resulting in setpoint adjustment and modification. As further seen in FIG. 7, a pinion 98 is attached, via a connecting shaft 100, to output shaft 92. The connecting shaft is secured to the output shaft by means of a pin 102. However, any other manner of securing the connecting shaft to the output shaft may be used.

In the specific model of liquid level controller being retrofitted in accordance with FIG. 7, both ends of shaft 96 are engaged and thus unavailable for mounting a gear wheel. Accordingly, there is provided a driving gear 104 for engaging and rotating shaft 96. A segment of gear 104 is removed, to permit the gear to slide radially into engagement with shaft 96. Upon engaging shaft 96, a clamp 106 is mounted to gear 104, thus enclosing the shaft 96 in engagement with the central hub of gear 104. Different techniques may be used to secure engagement between shaft 96 and gear 104. For example, a flat portion of shaft 96 may be engaged by a flat inner portion of clamp 106. Alternatively, a set screw 108 may be used to engage shaft 96 and the inner hub of gear 104. An intermediate gear 109 is provided between pinion 98 and the driving gear 104. A housing unit 111 securely positions the intermediate gear 109 relative to pinion 98 and driving gear 104.

In order to avoid accumulation of errors, and further to provide more precise control of the rotational position of shaft 96, there is included a feedback structure for reporting the rotational position of motor 90 to microprocessor 50. One such feedback apparatus is illustrated in FIG. 7 as a potentiometer 110, which is mounted to and driven by a rear portion of shaft 92. Thus, upon rotation of shaft 92 through a predetermined angular displacement, or through a predetermined number of steps, a control shaft 112 of potentiometer 110 is similarly rotated. With a constant voltage applied to two fixed contacts of the potentiometer, the voltage across the resistance between one of the fixed contacts and the moveable contact of the potentiometer may be read by the interface circuit 60 to provide the desired degree of feedback position verification for the step motor. As is also apparent from FIG. 7, housing 88 is mounted onto a rear wall portion 116 of the existing level controller by a pair of fasteners 118, which may be bolts or other fastening devices.

Accordingly, there has been described a retrofitting apparatus which permits load responsive setpoint adjustment for an existing level controller of a feedwater heater.

The following description provides additional details of the programs used for controlling operation of microprocessor 50 to perform the various steps involved both in obtaining DCA characteristics and in providing load responsive level setpoint adjustment.

Prior to describing the attached flowcharts, the method of obtaining the DCA characteristic is described as follows.

In view of the ability of a computer controlled system to obtain numerous readings and thus numerous datapoints, the arrangement of the present structure provides for numerous DCA and setpoint readings. For example, data points may be obtained each second of operation. However, the step motor may be commanded to change the setpoint only once every 20 seconds. By taking numerous readings for each setpoint adjustment, temperature variations and slope variations of the resultant characteristic due to drift, moderately slow oscillation and other noise may be statistically eliminated by averaging the numerous readings. Moreover, in order to avoid destabilizing the system, the capability of the computer controlled system to perform repetitive incrementation is utilized by minimizing the size of the increment in setpoint. Accordingly, the present apparatus is programmed to change the setpoint by uniformed increments and decrements, which may be in the range of 0.02 inches to 0.07 inches, to reduce the perturbations in controlled stability of the feedwater heater. To attain increments of the above described magnitude, the following gearing ratio may be used for the structure shown in FIGS. 7 and 8. In an environment where shaft 96 is constrained to rotate within a 300° range, and wherein the rotation of 300° is used to implement a liquid level change of 14 inches, the gear ratios of interface gearing unit 66 are selected so that each step of step motor 64 results in rotation of shaft 96 by approximately ½ of 1°. Accordingly, each step of motor 64 corresponds to a change in setpoint of approximately 0.023 inches. The control program for microprocessor 50 designates a time schedule whereby two steps are implemented per minute. Thus, the present invention results in a change in liquid level setpoint of less than 0.05 inches per minute, for example, avoiding perturbation and instability. Preferably, the change in setpoint is in the range of 0.05 to 0.15 inches per minute, permitting substantially continuous incrementation of the setpoint adjustment without requiring any additional waiting periods between the incrementation steps.

As a further advantage of the invention, the DCA characteristic is obtained in segments. In order to understand this facet of the invention, it should be appreciated that, as hereinabove noted, for each change in setpoint numerous datapoints are read. Thus, there may be 20 or 30 readings between each step executed by step motor 64. Several hundred datapoints may thus be obtained for each portion of the DCA characteristic. Since a DCA characteristic is substantially linear, the present invention utilizes a linear least-squares approximation for a straight line passing through the datapoints. To perform such an approximation, it is necessary to compute a number of sums and products.

The approach of the present invention, as illustrated by step 76 in FIG. 6, is to determine whether the slope of the DCA characteristic is in excess of a threshold value therefor, thus to identify the occurrence of a breakpoint in the DCA characteristic. Ideally, the slope should be computed for infinitesimally small segments of the characteristic, thus obtaining a continuous indication of the slope and the change in slope. However, as above noted, oscillation, drift and other noise affects the DCA characteristic and its slope. Thus, obtaining the characteristic slope for infinitesimally small segments of the DCA characteristic results in oscillations which are unrelated to the change in approach temperature as a function of setpoint. In accordance with the invention, the slopes are thus determined for segments of the characteristic, the segments taken to be as small as possible while sufficiently large to integrate and average the changes in slope due to noise, drift and the like. It will be appreciated that, by using the least-squares method, it is only necessary to retain the sums and products for a segment, rather than to retain the actual numerous datapoints for each segment. Accordingly, in the flowcharts subsequently described there is provided storage for the characteristic sums and products of the separate segments.

In another feature of the invention, the segments of the characteristic are made still smaller than may be desirable under the above identified constraint. That is, the segments may be smaller than necessary to integrate, or average, the unrelated oscillations in slope. However, the segment size suffices to obtain an otherwise substantially accurate indication of the instantaneous slope of the DCA characteristic.

Thus, in accordance with invention the change in slope is determined by obtaining an average slope for two successive segments. That is, the sums and products for the least-squares approximation are calculated for each incremental segment of the DCA curve but the slopes are obtained for segment pairs, where successive segment pairs overlap one another by one segment. Illustratively, for a portion of a curve having four segments, for each segment the various products and sums are obtained. However, the slope of the curve is obtained at the end of segment 2 for data associated with segments 1 and 2. Similarly, the slope is obtained at the conclusion of segment 3 of the curve for data obtained during segments 2 and 3. Finally, the slope at the end of segment 4 is obtained by use of the sums and products obtained during segments 3 and 4. Thus, the above noted overlap provides an enhanced continuity of the resultant DCA characteristic and an earlier detection of threshold slopes, as discussed below.

Occurrence of a breakpoint is detected by determining a change in the characteristic slope in excess of a predetermined threshold. Alternatively, it is the actual slope itself which may be compared with a threshold, as illustrated at step 76 of the flowcharts in FIG. 6.

Figure 9A:
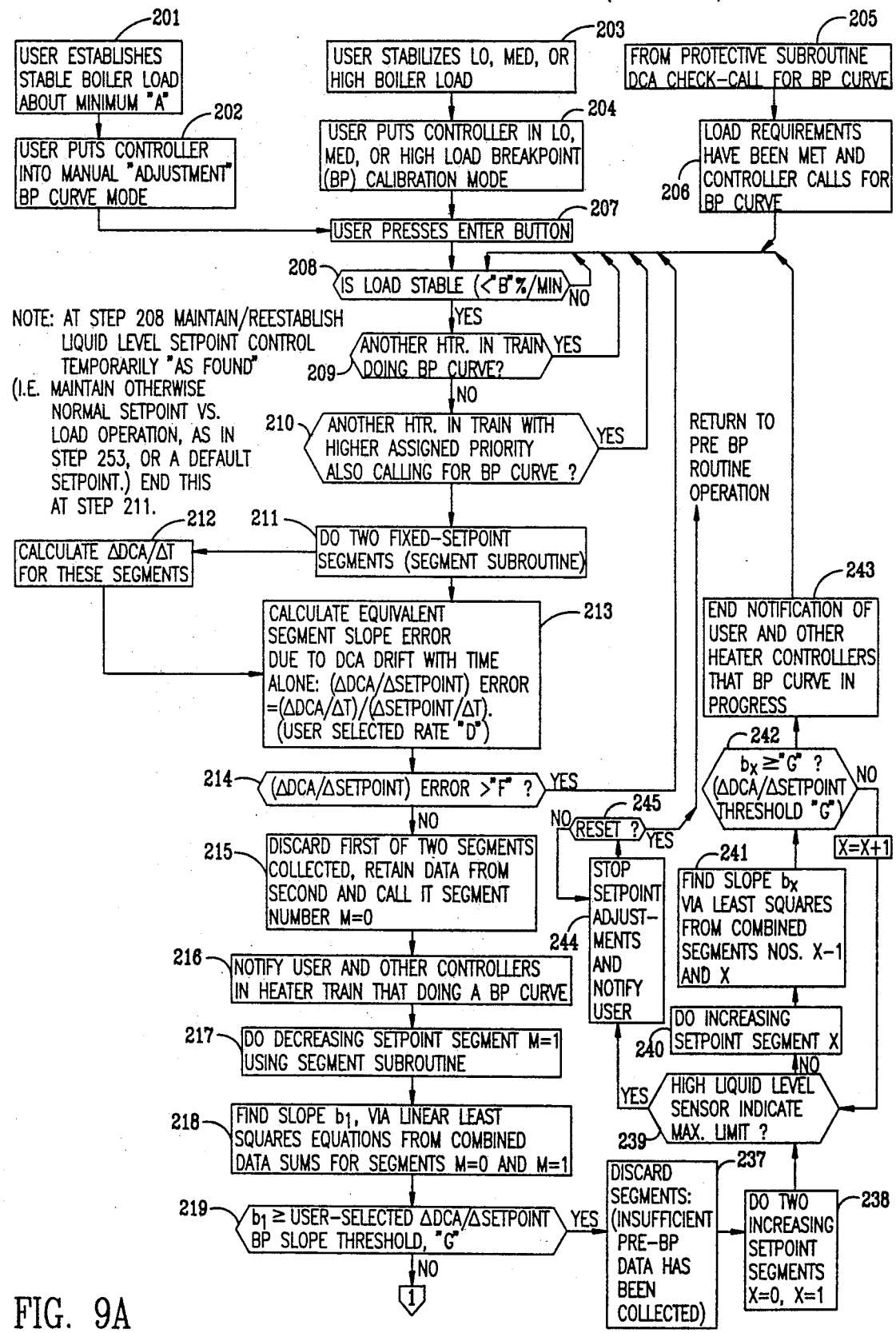
FIGS. 9A and 9B show details of flow charts controlling operation of the invention.
Figure 9B:
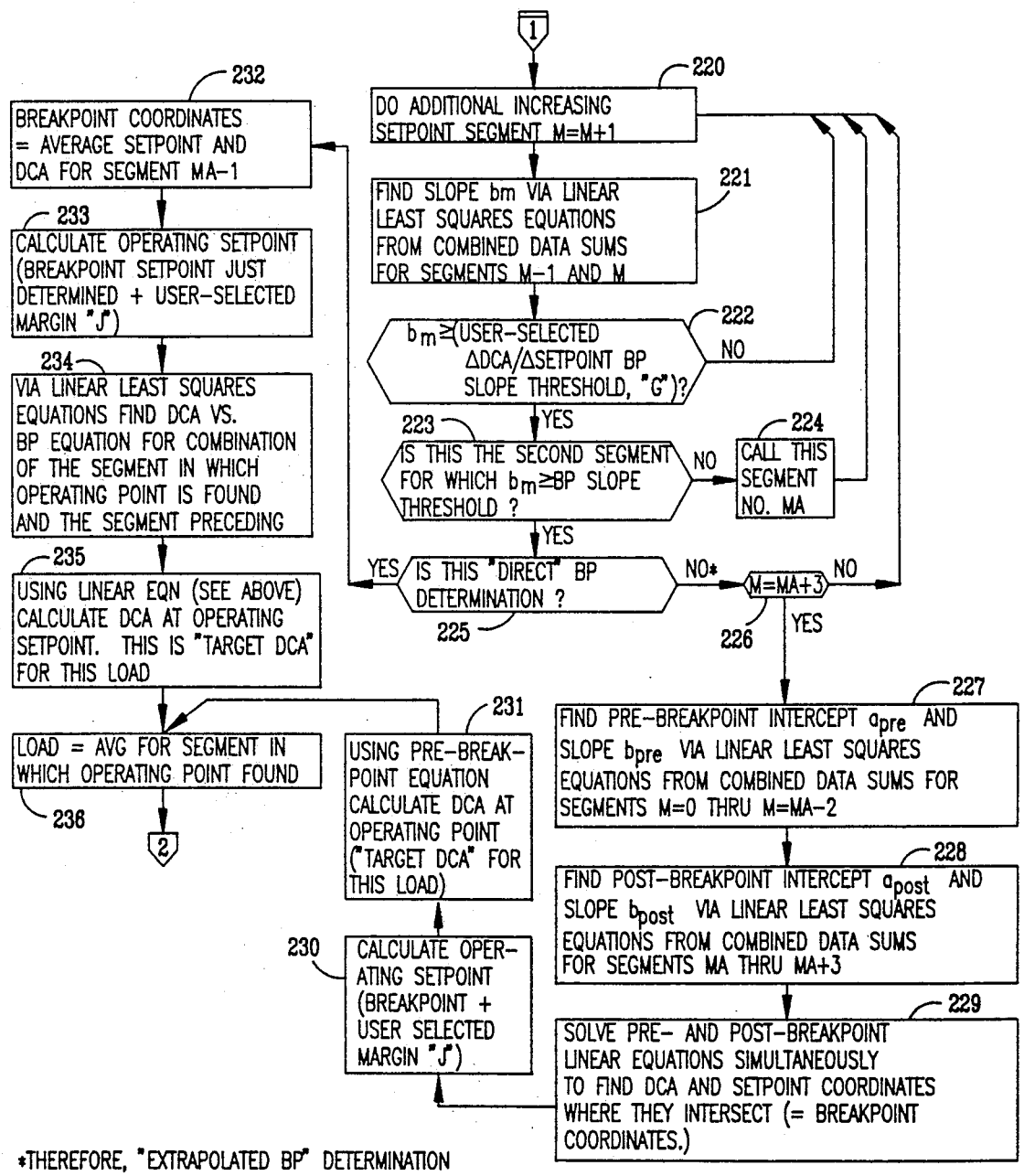
Figure 9C:
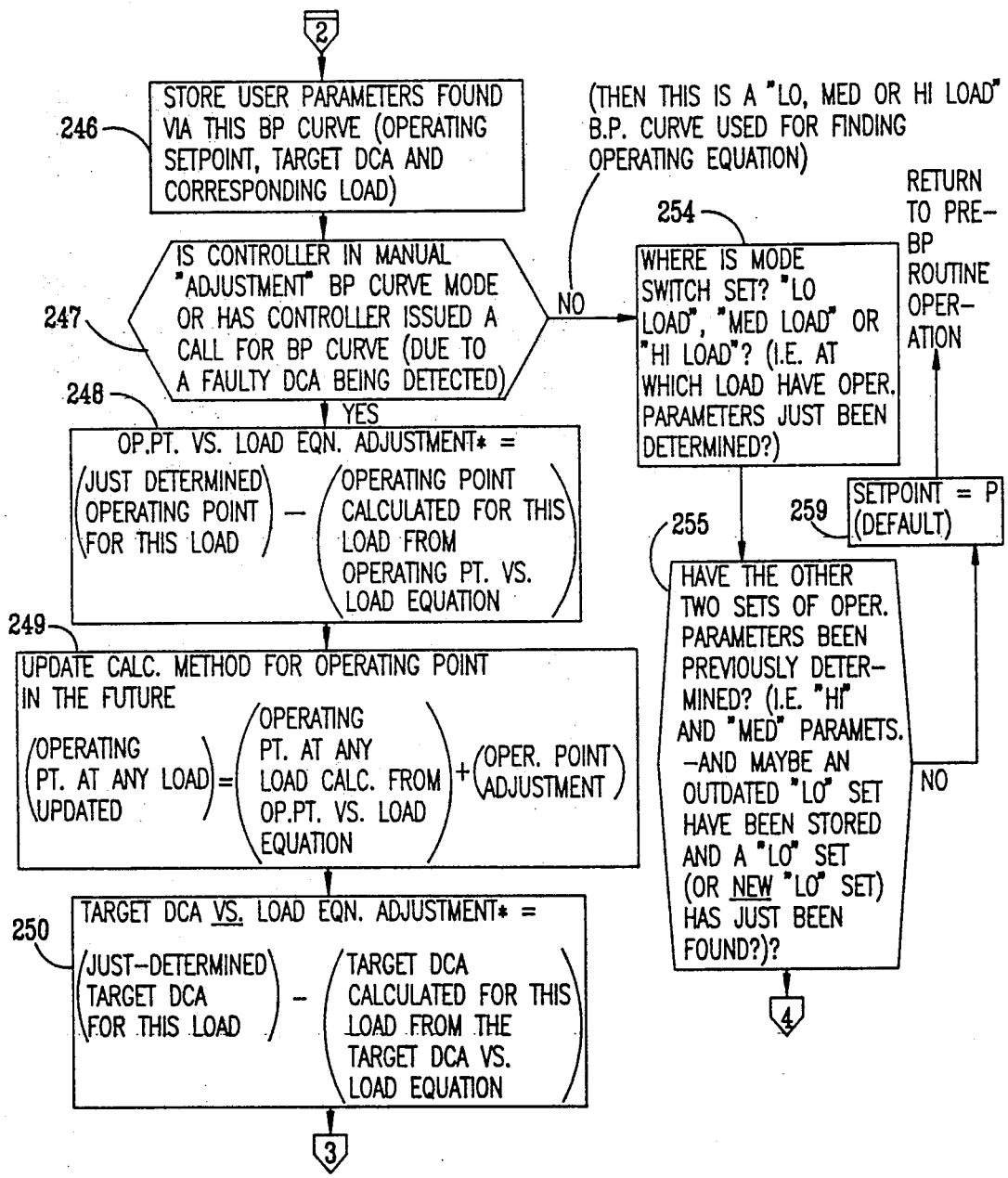
Figure 9E:
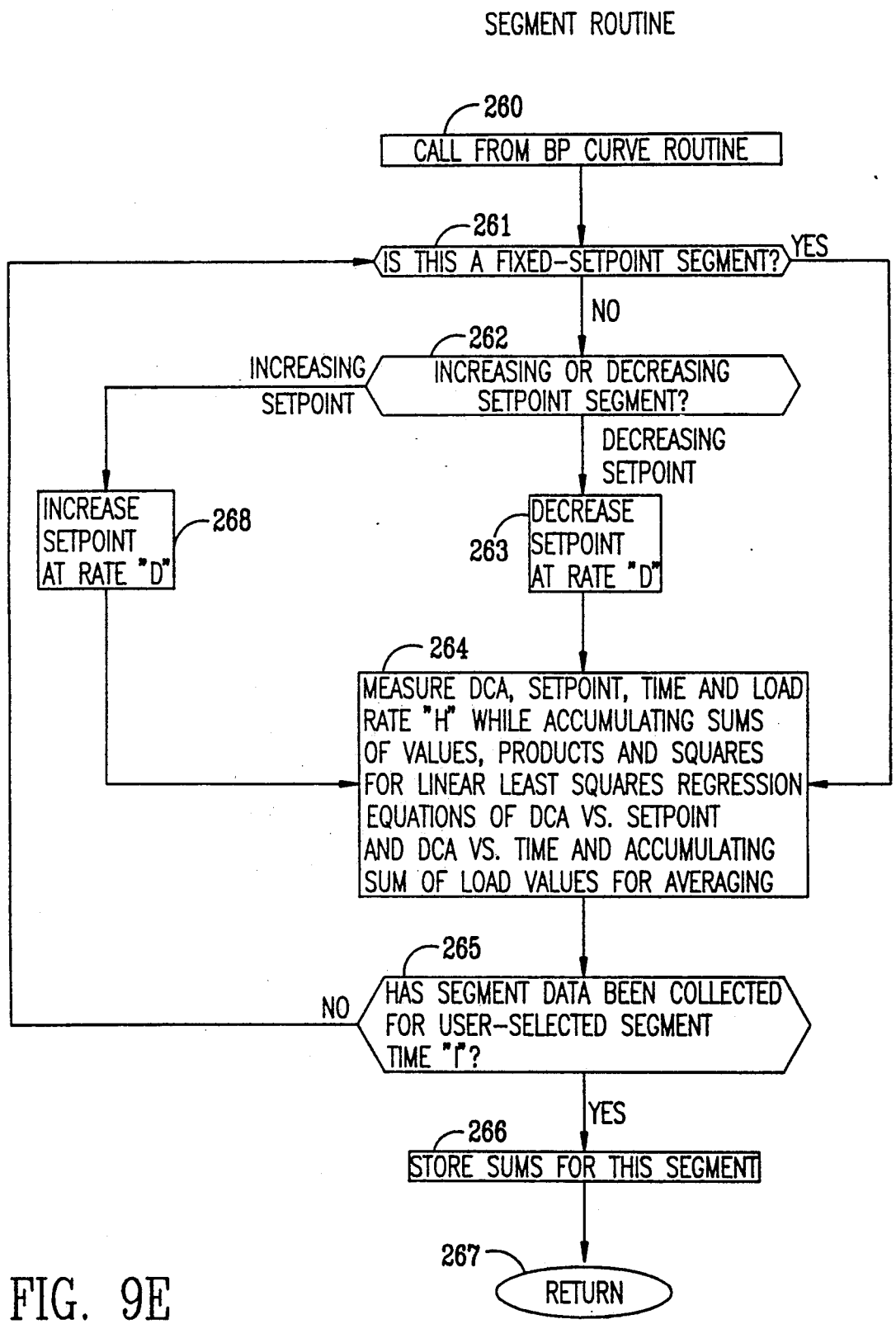

Referring now to FIGS. 9A and 9B, steps 201 and 202 provide one mode for entry to the main control program. Steps 201 and 202 permit the user to stabilize the boiler load condition at a minimal value, such as 50% of full rated value for example. Additionally, in step 202, the user may initiate generation of a special adjustment for breakpoint curve data to be used for corrections of the operational database during application thereof.

Steps 203 and 204 are user steps performed for DCA curves at low, medium or high load values. By operation appropriately labeled switches, the user thus places the controller in a low, medium or high load breakpoint calibration mode. Steps 205 and 206 are performed when a breakpoint curve is requested from a protective subroutine, as described at subsequent steps 273 and 288-291. When a DCA check performed by the above steps indicates that a special adjustment is needed in order to correct the operational database, the breakpoint establishment routine is automatically initiated.

Upon operation of an enter button by the user, at step 207, or through step 206, the control sequence transfers to step 208 wherein it is determined whether the load conditions are stable enough to further pursue initiating a DCA breakpoint curve (e.g. changing at no more than 1% per minute). If the load is inadequately stable, step 208 is continuously repeated until an affirmative answer results. Steps 209 and 210 are performed to confirm that no other heater in the train of heaters is establishing a DCA breakpoint curve at that time and that no heater with a higher priority is currently requesting determination of a DCA characteristic.

Note that operational setpoints continue to be maintained (or are established) in the AS-FOUND control mode, until/unless step 211 is initiated. Setpoints may be maintained or established, for example, by branching to and from step 253 at the appropriate time interval or by maintaining or establishing a default setpoint if it has been called for by step 259.

Step 211 calls the segment subroutine, illustrated at steps 260 through 267, to obtain data for two fixed-setpoint segments of the DCA characteristic in order to ascertain an equivalent drift rate in the DCA characteristic as well as in the slope thereof. By observation of the change in DCA with time, the equivalent slope of the DCA characteristic (reflecting change in DCA with change in setpoint) may be computed as illustrated at step 213 by dividing the observed time drift by the rate of change of setpoint which, as above noted, is preferably in the range of 0.05 to 0.15 inches per minute. If the slope computed in step 213 is in excess of a predetermined value, for example in excess of 0.5° F. per inch, step 214 causes the program to reinitiate by branching back to step 208. If the equivalent slope of DCA characteristic is within the prescribed limits, step 214 passes to step 215 wherein the second of the two fixed segments is retained as segment number $M_0$. Steps 216 through 218 provide notice to other controllers of the heater train that a DCA breakpoint curve is being performed, calling for the segment subroutine and decreasing the setpoint to establish a segment $M_1$. Linear least-squares regression is used to obtain a linear equation for the $M_0$ and $M_1$ segments and to obtain the slope for this portion of the pre-breakpoint characteristic. Step 219 tests whether the determined slope exceeds a threshold, which may be in the range of 1° F. to 5° F. per inch.

If the slope determined at step 219 exceeds the threshold, the breakpoint has been reached before enough data has been collected, or the operating characteristics of the heater have shifted such that the prior operating point was at or below the breakpoint; control passes to steps 237 through 243. Step 237 causes the segment data just obtained to be discarded, step 238 advances the setpoint by two segments and steps 239 through 242 call for the segment routine to increase the setpoint one or more segments until step 242 finds that the slope for two successive segments is below the threshold. Then the breakpoint-curve-being-done notification ends at step 243 and control is returned to step 208, after which the breakpoint routine is reinitiated when conditions are found suitable.

An independent level indicator is interfaced to the microprocessor and is checked at step 239 before each segmental increase. If a user specified maximum level is reached and the two-segment slopes still exceed the threshold, further adjustments are halted and the user is warned at step 244 until the user resets the control, after which pre-breakpoint routine operation is restored.

If the determined slope does not exceed the threshold, steps 220 through 225 are performed repeatedly. In these steps, the setpoint is repeatedly decreased to obtain data for further segments until the computed slope for successive segments exceeds the above noted threshold level. Once it is determined at step 223 that the slope exceeds the threshold, step 225 ascertains whether the breakpoint is to be determined by a direct method, wherein a breakpoint is established by the magnitude of the slope, or by obtaining an intersection between linear representations of a pre-breakpoint and a post-breakpoint segment of the DCA characteristic.

The particular manner in which the breakpoint is to be obtained may be identified by user activation of a specified switch, or by setting a software switch upon installation of the program. Alternatively, step 225 may be omitted and only a single one of the two methods may be provided for identifying the occurrence of a breakpoint. Nonetheless, the following description identifies both procedures.

It should be recalled that step 221 provides data for segments $M_{A-1}$ and $M_A$. In the direct method for obtaining the breakpoint, illustrated by steps 232-236, the breakpoint is assumed to be in segment $M_{A-1}$. The average DCA and average setpoint for segment $M_{A-1}$ are thus computed and established as to coordinates of the breakpoint at step 232. Addition of a user selected margin, in the range of 0.1 inch to 1.6 inch, for example, results in the operating setpoint for that breakpoint, as established at step 233. Further, at steps 234 and 235, a "target DCA" is obtained as the DCA at the operating setpoint (rather than the actual breakpoint). This value is found by interpolating the data in the corresponding segment, which may be done by using the linear least-squares technique. Step 236 establishes the load associated with the operating setpoint as the average value of the load for the segment in which the operating point is found.

Steps 246 through 258 provide the second database, relating the operating setpoint to the load conditions. This portion will be subsequently described.

If the extrapolated method is used to obtain the breakpoint, control transfers from step 225 to step 226 wherein an index is established to obtain data for a predetermined number of additional segments, beyond the breakpoint. Particularly, three additional segments are obtained in the illustrative arrangement of step 226. For the first two segments beyond the breakpoint, additional data is obtained. Once the third segment beyond the breakpoint is reached, step 226 transfers control to step 227 wherein the linear equation characterizing the pre-breakpoint segment of the curve is obtained. Step 228 obtains a linear equation for the post-breakpoint portion of the DCA characteristic. Both steps 227 and 228 may rely on linear least-squares techniques to obtain the straight-line equations from the various datapoints.

Step 229 solves for the intersection between the two linear equations obtained at steps 227 and 228 to identify the DCA and setpoint coordinates, thus identifying a breakpoint. Steps 230 and 231 repeat steps 233 and 235 and obtain the operating setpoint and the target DCA. Step 231, however, obtains the target DCA utilizing the pre-breakpoint equation obtained in step 227.

Steps 246 through 259 establish the database and control equation as follows.

Step 246 provides storage of the segment data and, particularly, the operating setpoint, the target DCA and the corresponding load. Step 247 queries the operating state of the controller, particularly to determine whether the controller is in a manually initiated adjustment mode for the breakpoint curve or a breakpoint curve is being determined due to detection of a faulty DCA value.

Upon an affirmative exit from step 247, step 248-251 determine the operating point and target DCA adjustment factors by subtracting expected operating setpoint and target DCA from the just-found values therefor. The expected values are calculated for the corresponding load using the setpoint vs. load and target DCA vs. load equations previously found from the operational database. Thereafter, the setpoint adjustment is added to all operating setpoints calculated using the operating point vs. load equation, for all loads. The target DCA adjustment is similarly added to the target DCA values.

Step 252 terminates a user notice established at step 216, and normal operation of the system resumes. As noted at step 253, during normal operation the operating setpoint is calculated from the operating setpoint vs. load equation, plus any adjustment as needed. The setpoint is updated at the above described rate, of 0.05 to 0.15 inches per minute, for example, by outputting a step command to step motor 64 two to six times each minute, for example. Periodic DCA checks are performed by using the target DCA curves obtained in steps 235, 231, and 250.

The normal mode of operation of step 253 thus provides the load responsive setpoint adjustment of the invention and continues unless and until a user or controller requires an operating mode change, such as while establishing further DCA data.

Where the result of step 247 is negative, i.e. the operational database is being established, the appropriate operating setpoint and target DCA are determined as functions of load. The load setting is identified at step 254 by reading a user set switch, identifying whether the data is obtained for a "low load", a "medium load" or a "high load", defined in terms of particular percentages of rated load.

Step 255 determines whether all three DCA characteristics have been obtained (for low, medium and high load). If not, a user installed default setpoint P is established. If the result of step 255 is affirmative, and the required number of parameter sets (operating setpoint, target DCA and load) are available for the proper number of load conditions, the operating setpoint vs. load equation is established at step 256 by any suitable mathematical technique, such as a parabolic least square approximation.

Although the foregoing refers to three DCA curves for three load levels, it will be appreciated that, as previously described, any number of curves (together with breakpoint and associated parameters) may be obtained. However, it is currently preferred to obtain three such curves which provide sufficient data to establish a second degree operating equation for controlling the setpoint as a function of load. More precise (higher order) equations may be obtained from data associated with a larger number of DCA curves.

The target DCA vs. load equation is similarly established at step 257 and, at step 258, the second database is established by storage of the equations found at steps 256-257.

The segment establishing routine of steps 260-268, called from step 217 of the breakpoint and operation routine, first determines at step 261 whether a fixed setpoint segment is being evaluated for equivalent drift (as described in connection with step 211) or if an incremented segment is being evaluated. For fixed setpoint segments, step 264 is executed, wherein DCA, setpoint, time and load rate are measured and appropriate mathematical procedures used to obtain a linear equation for the segment.

If an incremental DCA characteristic is being obtained, control proceeds to step 262 to determine whether the setpoint is to be incremented or decremented, and wherein steps 263 or 264 are executed prior to execution of step 264. Upon determining that the segment data has been collected for a predetermined length of time, within the range of one to eight minutes, for example, the segment routine returns to the calling step. If insufficient time has elapsed, steps 261-265 are again executed.

A check and alarm routine may be executed periodically, to ascertain that various parameters and operating conditions are within suitable ranges.

Figure 10:
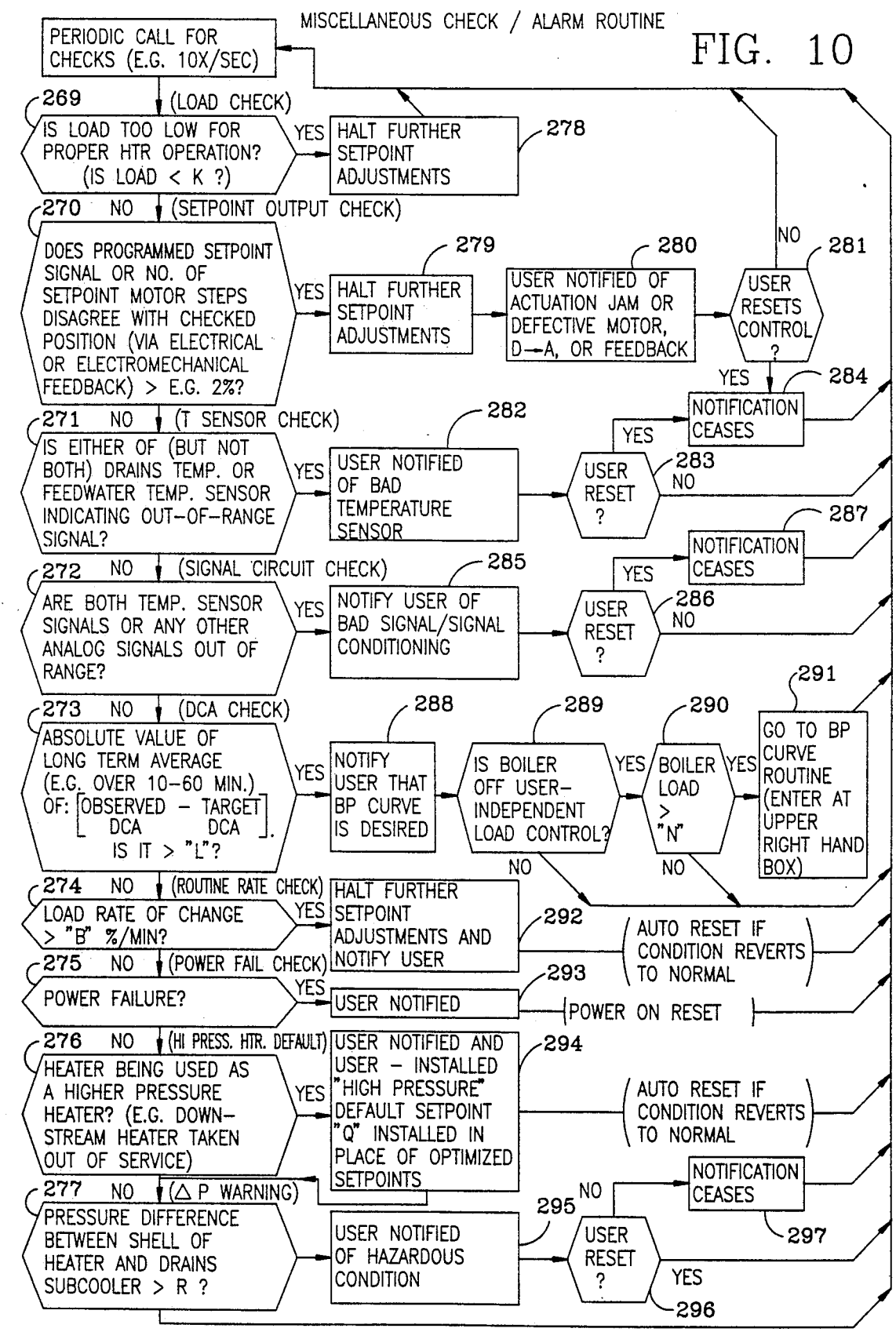
FIG. 10 provides a flowchart description of a program providing miscellaneous checks and alarms.

FIG. 10 provides a flowchart description of a program providing miscellaneous checks and alarms.

As noted in the unlabelled entry point thereto, the program illustrated by FIG. 10 is periodically repeated, and thus may be said to be operating in the background of the main breakpoint establishing and level control routines previously described. Thus, the various values and parameters may be checked by the program of FIG. 10 each 100 msec, or at other acceptable intervals.

At steps 269 and 278 thereof, the program ascertains whether the load is below a predetermined level "K". If the result of step 269 is affirmative, step 278 halts further adjustments of setpoints. When the check routing is executed and the load is within an acceptable range, the result of step 269 is affirmative and steps 270 and 279-281 determine if the number of rotations of the setpoint adjusting motor conforms to the number issued in a command thereto. If a disagreement exists, and the numbers differ by more than a predetermined quantity, further setpoint adjustments are halted in step 279 and the user is notified by actuation of an annunciator, which may provide audible or visual notification to the user, or by operation of other alarm generating devices. At step 281, it is tested to determine whether or not the user has reset a control. Operation of the annunciator terminates at step 284 upon detection of the user reset.

Step 271 checks if either, but not both, the drains temperature sensor or the feedwater temperature sensor is providing an out-of-range signal. If either signal is out-of-range, the user is notified at step 282 that a malfunctioning temperature sensor is detected. Step 283 determines whether or not the user has operated a control to reset this notification.

At step 272, the program checks whether both of the temperature signals, or any other analog signal, is out of range, to determine whether a signal conditioning element is malfunctioning. The user is appropriately notified, and the notification ceases upon user reset.

Steps 273 and 288-291 determine whether a long term error may be resulting in inaccurate data or control being provided by the main program of FIG. 9 and result in data adjustments as follows. At step 273, it is determined if the absolute value of the long term average of the difference between DCA and target DCA exceeds a limit, such as 0.2 to 1.6 degrees, for example. If so, the user is notified that a new DCA characteristic, including new breakpoint information, is desired. If the boiler is off load control and the boiler load exceeds a threshold, such as 60%, for example, an adjustment is required so that the adjustment breakpoint routine is called. The main routine is entered at step 205 of FIG. 9. This state of operation remains until the DCA curve is obtained or the need therefor is otherwise voided.

At steps 274 and 292, it is determined whether the load is stable. That is, is the rate of change of load in excess of a predetermined value? If the answer to the question posed at step 274 is affirmative, further setpoint adjustments are halted, and the user is notified at step 292. Upon reversion to normal operation, the condition and notification are automatically reset.

Steps 275 and 293 check for power failure and provide user notice, together with provision of a power-on reset therefor. Step 276 determines whether the system is to be used for replacement of a higher pressure heater, such as may occur when a downstream heater is taken out of service. User notice is generated at step 294, and rather than the optimized setpoints established by the inventive routines, a user established default setpoint is used for liquid level control. Upon reversion to normal operation, an automatic reset re-establishes the use of optimized breakpoints and setpoints for controlling liquid level as has been previously described.

At step 277, the routine determines whether an excessive pressure difference has occurred between the heater shell and the subcooler. Step 295 alerts the user to the existence of such a hazardous condition, while the alert is terminated at step 297 in response to detection at step 296 of a user reset.

From the foregoing, it will be appreciated that the present invention provides method and apparatus for obtaining various operating parameters as functions of load and for controlling a liquid level setpoint for a feedwater heater responsive to load conditions thus to provide more efficient and safe operation of such heaters.

The foregoing description of the preferred embodiment of the invention has been presented for purposes of illustration and description and is not intended to be exhaustive or to limit the invention to the precise forms disclosed since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto when interpreted in accordance with full breadth to which they are legally and equitably entitled.

I claim:

1. A control apparatus for maintaining optimum water levels in a feedwater heater of the type including an outer shell and an internal tubing structure, for receiving and condensing into water in the shell, steam from a steam turbine for heating feedwater that is flowing through the tubing structure to a steam boiler which supplies steam to the turbine, and for discharging liquid water from the shell while maintaining certain water levels in the bottom of the shell and in a drains subcooler portion of said feedwater heater, said apparatus comprising:

first means for storing, as a function of boiler load, breakpoint water level setpoint data and for calculating operating water level setpoint data from said breakpoint water level setpoint data, said breakpoint water level setpoint data having been determined from breakpoints of a plurality of curves, each representing a drains cooler approach temperature vs. water level setpoint characteristic for a predetermined boiler load;

water level sensing means for providing water level data corresponding to water levels measured in the bottom of the shell of said feedwater heater;

control means responsive to said operating water level setpoint data from said first means for receiving and responding to said water level data from said water level sensing means for controlling a discharge valve to discharge liquid water from the shell of said feedwater heater to control said liquid water level in the shell of said feedwater heater; and boiler load determining means for determining said boiler load and for providing boiler load data to said first means, said first means operable for establishing operating water level setpoints for said control means as a function of said boiler load data, thereby providing boiler load-responsive level control for said feedwater heater for optimizing operation thereof.

2. Apparatus as recited in claim 1, wherein said first means includes processing means, further including drains subcooler approach temperature sensing means for providing drains subcooler approach temperature data to said processing means, said processing means operable for establishing a first database correlating said drains subcooler approach temperature data as a function of water level setpoints for predetermined boiler load conditions so as to find said breakpoint water level setpoint data, corresponding to specific boiler loads, said processing means further operable for converting said first database to a second database correlating said breakpoint water level setpoints data as a function of boiler load, and for providing a particular operating water level setpoint to said control means in response to a particular boiler load provided by said boiler load determining means.

3. The apparatus recited in claim 2 wherein said processing means is further operable for converting the first data base to a third data base correlating target drains subcooler approach temperatures of the feedwater heater corresponding to the operating water level setpoints of the second data base a a function of boiler load and for comparing a drains subcooler approach temperature datum with the corresponding target drains subcooler approach temperature at a particular boiler load, thereby providing for checking for potentially unsafe changes in the operation of said feedwater heater.

4. The apparatus as recited in claim 1, wherein said control means comprises motor means and mechanical water level controller means; and in which the motor means is responsive to said operating water level setpoint data for driving the mechanical water level controller means for activating the discharge valve.

5. The apparatus recited in claim 4, wherein said control means further comprises retrofitting means, including a mechanical interface structure, for interacting an output shaft of said motor means to an adjusting means for adjusting a setpoint of said mechanical water level controller means.

6. Apparatus as recited in claim 1, wherein said discharge valve comprises electrically controlled valve means, and said control means comprises electrical proportional controller means, responsive to a signal from said first means representing said operating water level setpoint data and operable for generating an electrical signal for controlling said electrically controlled valve means.

7. Apparatus as recited in claim 1, wherein said discharge valve comprises pneumatically controlled valve means, and said control means comprises electrical proportional controller means, responsive to a signal from said first means representing said operating water level setpoint data and operable for generating an electrical signal, further comprising a transducer for converting said electrical signal generated by said electrical proportional controller means to a pneumatic pressure for adjusting said pneumatically controlled valve means.

8. The apparatus recited in claim 1 wherein the boiler load is determined from a shell pressure signal from said feedwater heater.

9. The apparatus recited in claim 1 wherein the boiler load is determined from a shell temperature signal from said feedwater heater.

10. In a control apparatus for maintaining optimum water levels in a feedwater heater of the type including an outer shell and an internal tubing structure, for receiving and condensing into water in the shell, steam from a steam turbine for heating feedwater that is flowing through the tubing structure to a steam boiler which supplies steam to the turbine, and for discharging liquid water from the shell while maintaining certain water levels in the bottom of the shell and in a drains subcooler portion of said feedwater heater, control means responsive to water level setpoints provided thereto for controlling a discharge valve to discharge liquid water from the shell of said feedwater heater to control said water level therein and drains subcooler approach sensing means for providing drains subcooler approach temperature data, the improvement comprising:

database generating means for generating a database correlating said drains subcooler approach temperature data as a function of said water level setpoints for predetermined boiler loads, including:

storage means receiving said drains subcooler approach temperature data and storing said drains subcooler approach temperature data as a function of said water level setpoints; and incrementing means for providing an incremental adjustment to the water level setpoints;

said incrementing means operable for providing a plurality of periodic incremental adjustments of said water level stepoints, said adjustments being spaced from one another by constant time intervals, said incremental adjustments being of magnitudes chosen to provide reduced perturbations in control stability of said feedwater heater and said constant time intervals being chosen to provide a condition approaching equilibrium in response to said incremental adjustment.

11. Apparatus as recited in claim 10, wherein said adjusting means comprises processing means responsive to storage of said drains subcooler approach temperatures for determining passage of said constant time interval and for providing a signal to said control means commanding modification of said water level setpoints by said incremental adjustment.

12. Apparatus as defined in claim 10, wherein said database generating means comprises processing means for performing computations required in generating said database and for providing control signals to said contort means for performing said incremental adjustments, and further comprising load determining means for identifying boiler loads and for providing boiler loads to said storage means, wherein said processing means is further operable for converting said database to a second database wherein said liquid level setpoints are stored in said storage means as a function of said boiler loads.

13. Apparatus as defined in claim 12, wherein said processing means is further operable for generating for said second database, additional water level setpoints between data points obtained from said first mentioned database thereby providing a setpoint characteristic for said feedwater heater as a function of boiler load.

14. Apparatus as defined in claim 13, wherein said processing means is further operable for controlling operation of a water level controller for said feedwater heater by providing signals representing water level setpoints for said feedwater heater obtained from said second database as a function of boiler load data provided by said load determining means.

15. A method for optimizing water level in a feedwater heater of the type including an outer shell and a internal tubing structure for receiving and condensing into water in the shell steam from a steam turbine for heating feedwater that is flowing through the tubing structure to a steam boiler of the turbine; control means responsive to water level setpoints provided thereto for controlling a discharge valve to discharge liquid water from the shell of said feedwater heater to control said water level therein; and drains subcooler approach sensing means for providing drains subcooler approach temperature data, comprising the steps of:

for a predetermined boiler load condition, periodically decrementing a setpoint for said control means, moving said setpoint at rates chosen to provide reduced perturbations in control stability of said feedwater heater, generating a database correlating said drains subcooler approach temperature data as a function of said water level setpoints for said predetermined boiler load condition thereby providing a curve of drains subcooler approach temperature data against water level setpoints, and for groups of said periodic decrements of said setpoints, comparing a function of a slope of the curve with a predetermined threshold therefor to determine a breakpoint of said curve thereby to determine a water level setpoint corresponding to said boiler load condition.

16. The method of claim 15 comprising the step of establishing a stable one of a plurality of boiler load conditions and, for each of said load conditions, generating a curve correlating drains subcooler approach temperature as a function of water level setpoints.

17. The method of claim 16 comprising the further step of converting said database including a plurality of curves to a second database wherein said water level setpoints are stored in a storage means as a function of said boiler load condition.

18. The method of claim 17 comprising the further step of determining a boiler load condition and, responsive thereto, accessing said second database for identifying a water level setpoint suitable for said feedwater heater operating under said determined boiler load condition.

19. A method for optimizing control of a water level in a feedwater heater of the type including an outer shell and an internal tubing structure for receiving and condensing into water in the shell steam from a steam turbine for heating feedwater that is flowing through the tubing structure to a steam boiler of the turbine, control means responsive to water level setpoints provided thereto for controlling a discharge valve to discharge liquid water from the shell of said feedwater heater to control said water level therein, means for providing boiler load data signals identifying a boiler load condition, and drains subcooler approach sensing means for providing drains subcooler approach temperature data, comprising the steps of:

receiving a boiler load data signal, responsively to said received boiler load data signal, accessing a database storing breakpoint water level setpoints as a function of said boiler load condition, said breakpoint water level setpoints having been determined from breakpoints of a plurality of curves, each representing a drains cooler approach temperature vs. water level setpoint characteristic for a predetermined boiler load, from said database, retrieving a breakpoint water level setpoint corresponding to the boiler load condition identified by said boiler load data signal, increasing the retrieved breakpoint water level setpoint to provide an operating setpoint containing a safety factor therein for a predetermined boiler load condition, providing an operating water level setpoint signal to said control means for establishing a water level corresponding to said boiler load condition.

20. The method of claim 19 comprising the further step of generating said database from the breakpoints of a plurality of curves each representing a drains cooler approach temperature vs. water level setpoint characteristic for the feedwater heater for a predetermined boiler load condition.

21. The method of claim 20 wherein said step of generating said database comprises the steps of:

determining a breakpoint water level setpoint from each of the breakpoints of said plurality of curves, correlating each of the determined breakpoint water level setpoints with the predetermined boiler load condition represented by the curve having that breakpoint, and establishing a characteristic operating equation representing a relationship between the breakpoint water level setpoints and the boiler load conditions for said breakpoints.

22. The method of claim 20 comprising the further steps of determining a breakpoint water level setpoint from each of the breakpoints of said plurality of curves, and obtaining a breakpoint water level setpoint corresponding to the received boiler load signal by interpolating between two datapoints of said database that correlate breakpoint water level setpoints with corresponding boiler load conditions represented by breakpoints of two curves obtained for different boiler load conditions.

23. The method of claim 19 including determining the boiler load conditions from a shell pressure signal from the feedwater heater.

24. The method of claim 19 including determining the boiler load condition from a shell temperature signal from the feedwater heater.

25. A method for optimizing water level in a feedwater heater of the type including an outer shell and an internal tubing structure for receiving and condensing into water in the shell steam from a steam turbine for heating feedwater that is flowing through the tubing structure to a steam boiler of the turbine; control means responsive to water level setpoints provided thereto for controlling a discharge valve to discharge liquid water from the shell of said feedwater heater to control said water level therein; and drains subcooler approach sensing means for providing drains subcooler approach temperature data, comprising the steps of:

for a predetermined boiler load condition periodically incrementing a setpoint for said control means, moving said setpoint at rates chosen to provide reduced perturbations in control stability of said feedwater heater, generating a database correlating said drains subcooler approach temperature data as a function of said water level setpoints for said predetermined boiler load condition thereby providing a curve of drains subcooler approach temperature data against water level setpoints, and for groups of said periodic increments of said setpoints, comparing a function of a slope of the curve with a predetermined threshold therefor to determine a breakpoint of said curve thereby to determine a water level setpoint corresponding to said boiler load condition.

26. A method for optimizing water level in a feedwater heater of the type including an outer shell and an internal tubing structure for receiving and condensing into water in the shell steam from a steam turbine for heating feedwater that is flowing through the tubing structure to a steam boiler of the turbine; control means responsive to water level setpoints provided thereto for controlling a discharge valve to discharge liquid water from the shell of said feedwater heater to control said water level therein; and drains subcooler approach sensing means for providing drains subcooler approach temperature data, comprising the steps of:

for a predetermined boiler load condition periodically decrementing a setpoint for said control means, moving said setpoint at rates chosen to provide reduced perturbations in control stability of said feedwater heater, generating a database correlating said drains subcooler approach temperature data as a function of said water level setpoints for said predetermined boiler load condition thereby providing a curve of drains subcooler approach temperature data against water level setpoints, and for each of said periodic decrements of said setpoints, comparing a function of a slope of the curve with a predetermined threshold therefor to determine a breakpoint of said curve thereby to determine a water level setpoint corresponding to said boiler load condition.

27. A method for optimizing water level in a feedwater heater of the type including an outer shell and an internal tubing structure for receiving and condensing into water in the shell steam from a steam turbine for heating feedwater that is flowing through the tubing structure to a steam boiler of the turbine; control means responsive to water level setpoints provided thereto for controlling a discharge valve to discharge liquid water from the shell of said feedwater heater to control said water level therein; and drains subcooler approach sensing means for providing drains subcooler approach temperature data, comprising the steps of:

for a predetermined boiler load condition periodically incrementing a setpoint for said control means, moving said setpoint at rates chosen to provide reduced perturbations in control stability of said feedwater heater, generating a database correlating said drains subcooler approach temperature data as a function of said water level setpoints for said predetermined boiler load condition thereby providing a curve of drains subcooler approach temperature data against water level setpoints, and for each of said periodic increments of said setpoints, comparing a function of a slope of the curve with a predetermined threshold therefor to determine a breakpoint of said curve thereby to determine a water level setpoint corresponding to said boiler load condition.

28. A control apparatus for maintaining optimum water levels in a feedwater heater of the type including an outer shell and an internal tubing structure, for receiving and condensing into water in the shell, steam from a steam turbine for heating feedwater that is flowing through the tubing structure to a steam boiler which supplies steam to the turbine and for discharging liquid water from the shell while maintaining certain water levels in the bottom of the shell and in a drains subcooler portion of said feedwater heater, said apparatus comprising:

first means for storing, as a function of boiler load, operating water level setpoint data, said operating water level setpoint data having been determined from breakpoint water level setpoint data, said breakpoint water level setpoint data having been determined from breakpoints of a plurality of curves, each representing a drains cooler approach temperature vs. water level setpoint characteristic for a predetermined boiler load;

water level sensing means for providing water level data corresponding to water levels measured in the bottom of the shell of said feedwater heater;

control means responsive to said operating water level setpoint data from said first means for receiving and responding to said water level data from said water level sensing means for controlling a discharge valve to discharge liquid water from the shell of said feedwater heater to control said liquid water level in the shell of said feedwater heater; and boiler load determining means for determining said boiler load and for providing boiler load data to said first means, said first means operable for establishing operating water level setpoints for said control means as a function of said boiler load data, thereby providing boiler load-responsive level control for said feedwater heater for optimizing operation thereof.

29. A method for optimizing control of a water level in a feedwater heater of the type including an outer shell and a internal tubing structure for receiving and condensing into water in the shell steam from a steam turbine for heating feedwater that is flowing through the tubing structure to a steam boiler of the turbine, control means responsive to water level setpoints provided thereto for controlling a discharge valve to discharge liquid water from the shell of said feedwater heater to control said water level therein, means for providing boiler load data signals identifying a boiler load condition, and drains subcooler approach sensing means for providing drains subcooler approach temperature data, comprising the steps of:

receiving a boiler load data signal, responsively to said received boiler load data signal, accessing a database storing breakpoint water level setpoints as a function of said boiler load condition, said operating water level setpoints having been determined from breakpoint water level setpoints, said breakpoint water level setpoints having been determined from breakpoints of a plurality of curves, each representing a drains cooler approach temperature vs. water level setpoint characteristic for a predetermined boiler load, from said database, retrieving a breakpoint water level setpoint corresponding to the boiler load condition identified by said boiler load data signal, providing an operating water level setpoint signal to said control means for establishing a water level corresponding to said boiler load condition.

* * * * *